(12) United States Patent
Furumoto et al.

(10) Patent No.: US 12,464,842 B2
(45) Date of Patent: Nov. 4, 2025

(54) SOLID-STATE IMAGING DEVICE AND ELECTRONIC APPARATUS HAVING LIGHT-SHIELDING PORTIONS OF DIFFERENT HEIGHTS

(71) Applicant: SONY SEMICONDUCTOR SOLUTIONS CORPORATION, Kanagawa (JP)

(72) Inventors: Kazuya Furumoto, Kanagawa (JP); Yuya Maeda, Kanagawa (JP); Yoshiaki Kitano, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 333 days.

(21) Appl. No.: 18/043,967

(22) PCT Filed: Aug. 2, 2021

(86) PCT No.: PCT/JP2021/028650
§ 371 (c)(1),
(2) Date: Mar. 3, 2023

(87) PCT Pub. No.: WO2022/064853
PCT Pub. Date: Mar. 31, 2022

(65) Prior Publication Data
US 2024/0030250 A1 Jan. 25, 2024

(30) Foreign Application Priority Data
Sep. 25, 2020 (JP) .................. 2020-161227

(51) Int. Cl.
*H10F 39/00* (2025.01)
*H04N 25/702* (2023.01)
(Continued)

(52) U.S. Cl.
CPC ....... *H10F 39/8057* (2025.01); *H04N 25/702* (2023.01); *H10F 39/182* (2025.01);
(Continued)

(58) Field of Classification Search
CPC .. H10F 39/8057; H10F 39/182; H10F 39/806; H10F 39/18; H10F 39/199;
(Continued)

(56) References Cited

U.S. PATENT DOCUMENTS

2012/0235266 A1\* 9/2012 Ootsuka .............. H10F 39/8053
257/E31.127
2016/0035774 A1 2/2016 Noh et al.
(Continued)

FOREIGN PATENT DOCUMENTS

CN 110164887 8/2019
JP 2015153975 A 8/2015
(Continued)

OTHER PUBLICATIONS

International Search Report and Written Opinion prepared by the Japan Patent Office on Aug. 30, 2021, for International Application No. PCT/JP2021/028650, 2 pgs.

*Primary Examiner* — Georgia Y Epps
*Assistant Examiner* — Erin R Garber
(74) *Attorney, Agent, or Firm* — SHERIDAN ROSS P.C.

(57) ABSTRACT

Provided is a solid-state imaging device capable of acquiring an image with higher image quality. It includes a plurality of pixel units including on-chip lenses, color filters, and photoelectric conversion units. The plurality of pixel units includes a first pixel unit (e.g., a pixel unit of an imaging pixel) and a second pixel unit (e.g., a pixel unit of a phase-difference detection pixel), the first pixel unit including an on-chip lens of a predetermined size, the second pixel unit including an on-chip lens of a size larger than the
(Continued)

predetermined size, the first pixel unit including first pixel units, the second pixel unit including second pixel units. A height of an inter-CF light-shielding portion surrounding the respective color filters of the second pixel units is larger than a height of an inter-CF light-shielding portion between the color filters of the first pixel units.

19 Claims, 32 Drawing Sheets

(51) Int. Cl.
*H10F 39/18* (2025.01)
*H04N 25/704* (2023.01)
*H10F 39/12* (2025.01)

(52) U.S. Cl.
CPC ....... *H10F 39/8053* (2025.01); *H10F 39/806* (2025.01); *H10F 39/8063* (2025.01); *H10F 39/807* (2025.01); *H04N 25/704* (2023.01); *H10F 39/18* (2025.01); *H10F 39/199* (2025.01); *H10F 39/8023* (2025.01); *H10F 39/8027* (2025.01)

(58) Field of Classification Search
CPC ............. H10F 39/8023; H10F 39/8027; H10F 39/8053; H10F 39/8063; H10F 39/807; H04N 25/616; H04N 25/78; H04N 25/702; H04N 25/704; H04N 23/672
See application file for complete search history.

(56) References Cited

U.S. PATENT DOCUMENTS

| 2017/0117313 | A1  |  4/2017 | Nakano |            |
|--------------|-----|---------|--------|------------|
| 2018/0076247 | A1* |  3/2018 | Pang   | H10F 39/8063 |
| 2019/0319060 | A1* | 10/2019 | Do     | H10F 39/8023 |
| 2021/0120198 | A1* |  4/2021 | Kim    | H04N 25/11 |
| 2021/0288090 | A1* |  9/2021 | Li     | H10F 39/8053 |

FOREIGN PATENT DOCUMENTS

| JP | 2016-012628 | 1/2016 |
| JP | 2018-011246 | 1/2018 |
| JP | 2018-201015 | 12/2018 |
| WO | WO-2020137285 A1 | 7/2020 |

\* cited by examiner

SOLID-STATE IMAGING DEVICE AND ELECTRONIC APPARATUS HAVING LIGHT-SHIELDING PORTIONS OF DIFFERENT HEIGHTS

CROSS REFERENCE TO RELATED APPLICATIONS

This application is a national stage application under 35 U.S.C. 371 and claims the benefit of PCT Application No. PCT/JP2021/028650, having an international filing date of 2 Aug. 2021, which designated the United States, which PCT application claimed the benefit of Japanese Patent Application No. 2020-161227, filed 25 Sep. 2020, the entire disclosures of each of which are incorporated herein by reference.

TECHNICAL FIELD

The present technology relates to a solid-state imaging device and an electronic apparatus.

BACKGROUND ART

In the past, a solid-state imaging device that includes a plurality of pixel units including on-chip lenses, color filters, and photoelectric conversion units has been proposed (see, for example, Patent Literature 1). In the solid-state imaging device described in Patent Literature 1, by disposing an inter-color-filter light-shielding portion that blocks incident light between the color filters so as to surround the respective color filters of the pixel units, it is possible to prevent incident light that has entered the color filter of one pixel unit from entering the color filter of another pixel unit to cause optical color mixing and improve the image quality of an image acquired by the solid-state imaging device.

CITATION LIST

Patent Literature

Patent Literature 1: Japanese Patent Application Laid-open No. 2018-201015

DISCLOSURE OF INVENTION

Technical Problem

In such a solid-state imaging device, it is desired to further improve image quality.

It is an object of the present disclosure to provide a solid-state imaging device and an electronic apparatus that are capable of acquiring an image with higher image quality.

Solution to Problem

A solid-state imaging device according to the present disclosure includes: (a) a plurality of pixel units including on-chip lenses, color filters, and photoelectric conversion units; and (b) a lattice-shaped inter-color-filter light-shielding portion formed on a side of light incident surfaces of the photoelectric conversion units so as to surround the respective color filters of the plurality of pixel units, (c) the plurality of pixel units including a first pixel unit and a second pixel unit, the first pixel unit including an on-chip lens of a predetermined size, the second pixel unit including an on-chip lens of a size larger than the predetermined size, the first pixel unit including first pixel units, the second pixel unit including second pixel units, (d) a height of the inter-color-filter light-shielding portion surrounding the respective color filters of the second pixel units being larger than a height of the inter-color-filter light-shielding portion between the respective color filters of the first pixel units.

Further, an electronic apparatus according to the present disclosure includes: a solid-state imaging device that includes: (a) a plurality of pixel units including on-chip lenses, color filters, and photoelectric conversion units, and (b) a lattice-shaped inter-color-filter light-shielding portion formed on a side of light incident surfaces of the photoelectric conversion units so as to surround the respective color filters of the plurality of pixel units, (c) the plurality of pixel units including a first pixel unit and a second pixel unit, the first pixel unit including an on-chip lens of a predetermined size, the second pixel unit including an on-chip lens of a size larger than the predetermined size, the first pixel unit including first pixel units, the second pixel unit including second pixel units, (d) a height of the inter-color-filter light-shielding portion surrounding the respective color filters of the second pixel units being larger than a height of the inter-color-filter light-shielding portion between the respective color filters of the first pixel units.

MODE(S) FOR CARRYING OUT THE INVENTION

Figure 1:
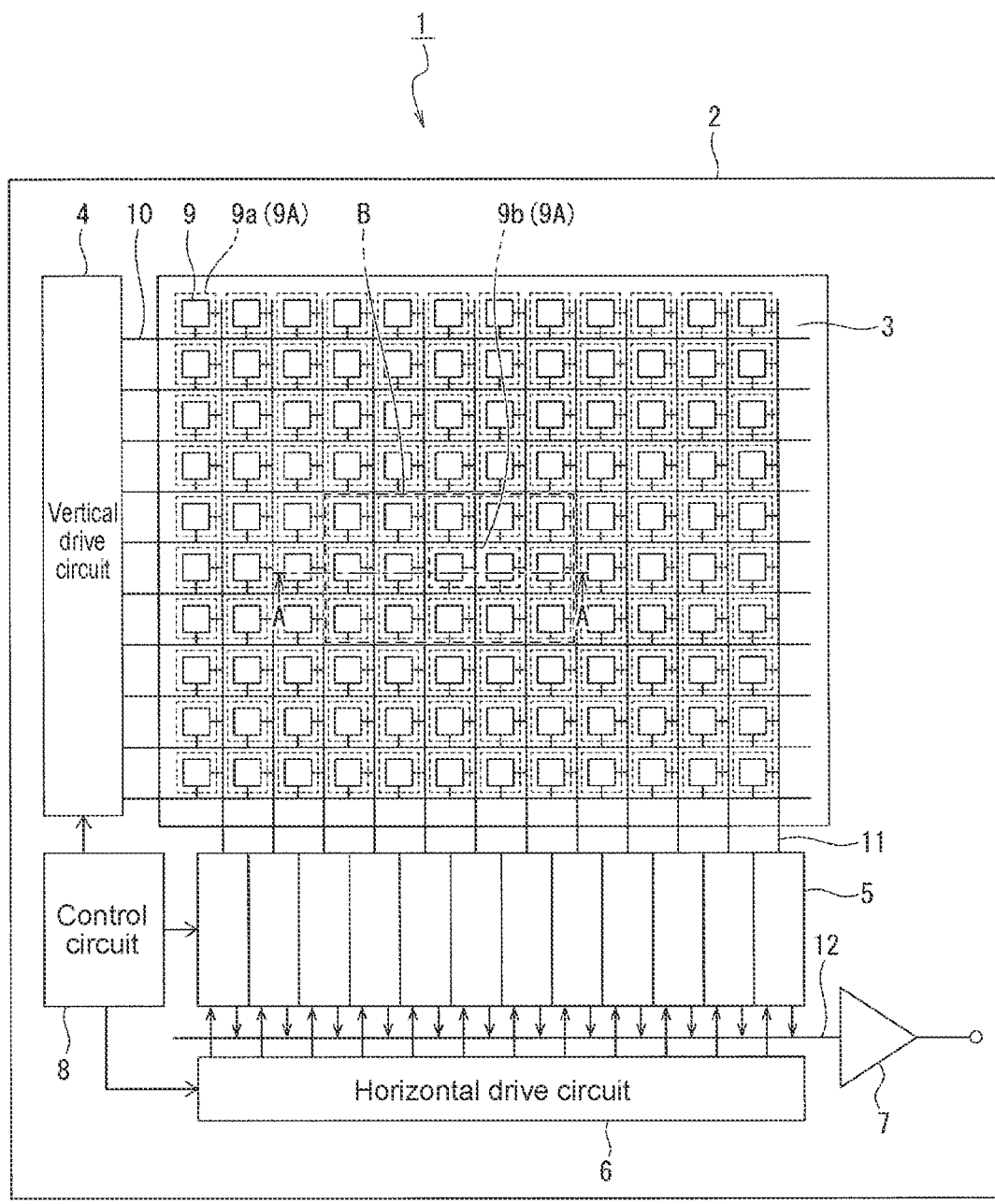
FIG. 1 is a diagram showing a configuration of an entire solid-state imaging device according to a first embodiment.

The present inventors have found the following problems in the solid-state imaging device described in Patent Literature 1.

In the technology described in Patent Literature 1, for example, there has been a possibility that in the case where a solid-state imaging device includes: a first pixel unit including an on-chip lens of a predetermined size; and a second pixel unit including an on-chip lens of a size larger than the predetermined size (for example, pixel units) and the second pixel units are arranged separately between the first pixel units arranged in a two-dimensional matrix, the size of an edge of a projecting lens surface of the on-chip lens of the second pixel unit (hereinafter, referred to also as an "edge of the on-chip lens") is smaller than the design value when producing the solid-state imaging device. Then, there has been a possibility that a flat boundary region that does not contribute to collection of incident light is formed between the edge of the on-chip lens of the second pixel unit and the edge of the on-chip lens of the adjacent first pixel unit. Therefore, there has been a possibility that in the case where incident light that travels obliquely from the second pixel unit side to the first pixel unit side enters the boundary region, the oblique incident light travels straight without being collected by the on-chip lens. Therefore, there has been a possibility that, for example, in the case where the height of an inter-color-filter light-shielding portion (hereinafter, referred to also as "an inter-CF light-shielding portion") is made smaller in the entire region of the pixel region, incident light that has been transmitted through the boundary region is not blocked by the inter-CF light-shielding portion in the first pixel unit adjacent to the second pixel unit and enters the color filter of the first pixel unit to cause optical color mixing and the image quality of an image acquired by the solid-state imaging device is reduced. Meanwhile, for example, in the case where the height of the inter-CF light-shielding portion is made smaller in the entire region of the pixel region, there has been a possibility that incident light that has been transmitted through the on-chip lens of the first pixel unit strikes the inter-CF light-shielding portion on the light incident surface side and is reflected thereby in the first pixel unit, the amount of incident light that enters the photoelectric conversion unit is reduced, the sensitivity is reduced, and the image quality of an obtained image is reduced.

An example of a solid-state imaging device and an electronic apparatus according to embodiments of the present disclosure will be described with reference to FIG. 1 to FIG. 32. The embodiments of the present disclosure will be described in the following order. Note that the present disclosure is not limited to the following examples. Further, the effects described in the specification are merely examples and not limitative, and additional effects may be exhibited.

Figure 27:
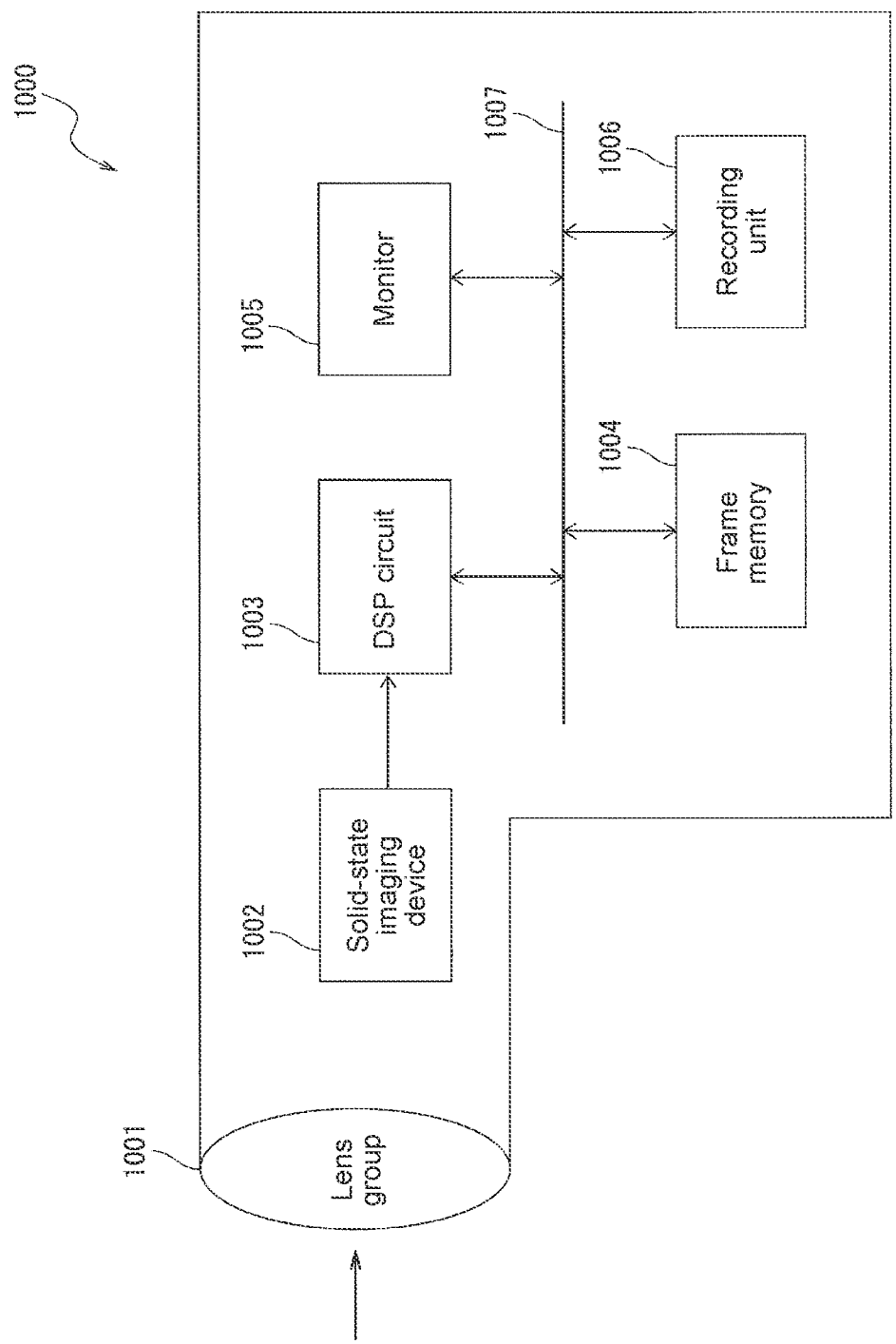
FIG. 27 is a diagram showing an example of a schematic configuration of an electronic apparatus.

1. First Embodiment: Solid-State Imaging Device 1-1 Configuration of entire solid-state imaging device
   1-2 Configuration of main parts
   1-3 Modified example
2. Second embodiment: Solid-state imaging device
3. Third embodiment: Solid-state imaging device
4. Fourth embodiment: Solid-state imaging device
5. Fifth embodiment: Solid-state imaging device
6. Sixth embodiment: Solid-state imaging device
7. Seventh embodiment: Solid-state imaging device
8. Eighth embodiment: Solid-state imaging device
9. Ninth embodiment: Solid-state imaging device
10. Tenth embodiment: Solid-state imaging device
11. Eleventh embodiment: Solid-state imaging device
12. Modified example
13. Application example to electronic apparatus
   13-1 Configuration of entire electronic apparatus
   13-2 Usage example of CMOS image sensor
14. Application example to moving object
15. Application example to endoscopic surgery system 1. First Embodiment 1-1 Configuration of Entire Solid-State Imaging Device FIG. 1 is a diagram showing a configuration of an entire solid-state imaging device 1 according to a first embodiment. The solid-state imaging device 1 in FIG. 1 is a back-illuminated CMOS (Complementary Metal Oxide Semiconductor) image sensor. As shown in FIG. 27, the solid-state imaging device 1 (solid-state imaging device 1002) takes in image light (incident light) from a subject via a lens group 1001, converts the light amount of incident light formed on the imaging surface into an electrical signal in units of pixels, and outputs the obtained signal as a pixel signal.

As shown in FIG. 1, the solid-state imaging device 1 includes, on a substrate 2, a pixel region 3 and a peripheral circuit unit disposed around the pixel region 3.

The pixel region 3 includes a plurality of pixels 9 arrayed in a two-dimensional matrix. The pixel 9 includes a photoelectric conversion unit 23 shown in FIG. 2A and a plurality of pixel transistors (not shown). As the pixel transistor, for example, four transistors of a transfer transistor, a reset transistor, a selection transistor, and an amplifier transistor can be employed.

The peripheral circuit unit includes a vertical drive circuit 4, a column signal processing circuit 5, a horizontal drive circuit 6, an output circuit 7, and a control circuit 8.

The vertical drive circuit 4 includes, for example, a shift register, selects a desired pixel drive wire 10, and supplies a pulse for driving the pixel 9 to the selected pixel drive wire 10 to drive the respective pixels 9 on a row-by-row basis. That is, the vertical drive circuit 4 selectively scans the respective pixels 9 of the pixel region 3 on a row-by-row basis sequentially in the perpendicular direction, and supplies a pixel signal based on the signal charges generated in accordance with the amount of received light in the photoelectric conversion unit 23 of each of the pixels 9 to the column signal processing circuit 5 via a vertical signal line 11.

The column signal processing circuit 5 is disposed, for example, for each column of the pixels 9, and performs signal processing such as noise removal on a signal output from the pixels 9 in one row for each pixel column. For example, the column signal processing circuit 5 performs signal processing such as CDS (Correlated Double Sampling) for removing fixed pattern noise unique to the pixel and AD (Analog Digital) conversion.

The horizontal drive circuit 6 includes, for example, a shift register, sequentially outputs a horizontal scanning pulse to the column signal processing circuit 5 to select each of the column signal processing circuits 5 in turn, and causes each of the column signal processing circuits 5 to output a pixel signal on which signal processing has been performed to a horizontal signal line 12.

The output circuit 7 performs signal processing on a pixel signal sequentially supplied from each of the column signal processing circuits 5 via the horizontal signal line 12 and outputs the obtained pixel signal. As the signal processing, for example, buffering, black level adjustment, column variation correction, or various types of digital signal processing can be used.

The control circuit 8 generates clock signals and control signals that serve as a reference for operations of the vertical drive circuit 4, the column signal processing circuit 5, the horizontal drive circuit 6, and the like on the basis of a vertical synchronization signal, a horizontal synchronization signal, and a master clock signal. Then, the control circuit 8 outputs the generated clock signals and control signals to the vertical drive circuit 4, the column signal processing circuit 5, the horizontal drive circuit 6, and the like.

1-2 Configuration of Main Parts

Next, a detailed structure of the solid-state imaging device 1 will be described.

Figure 2A:
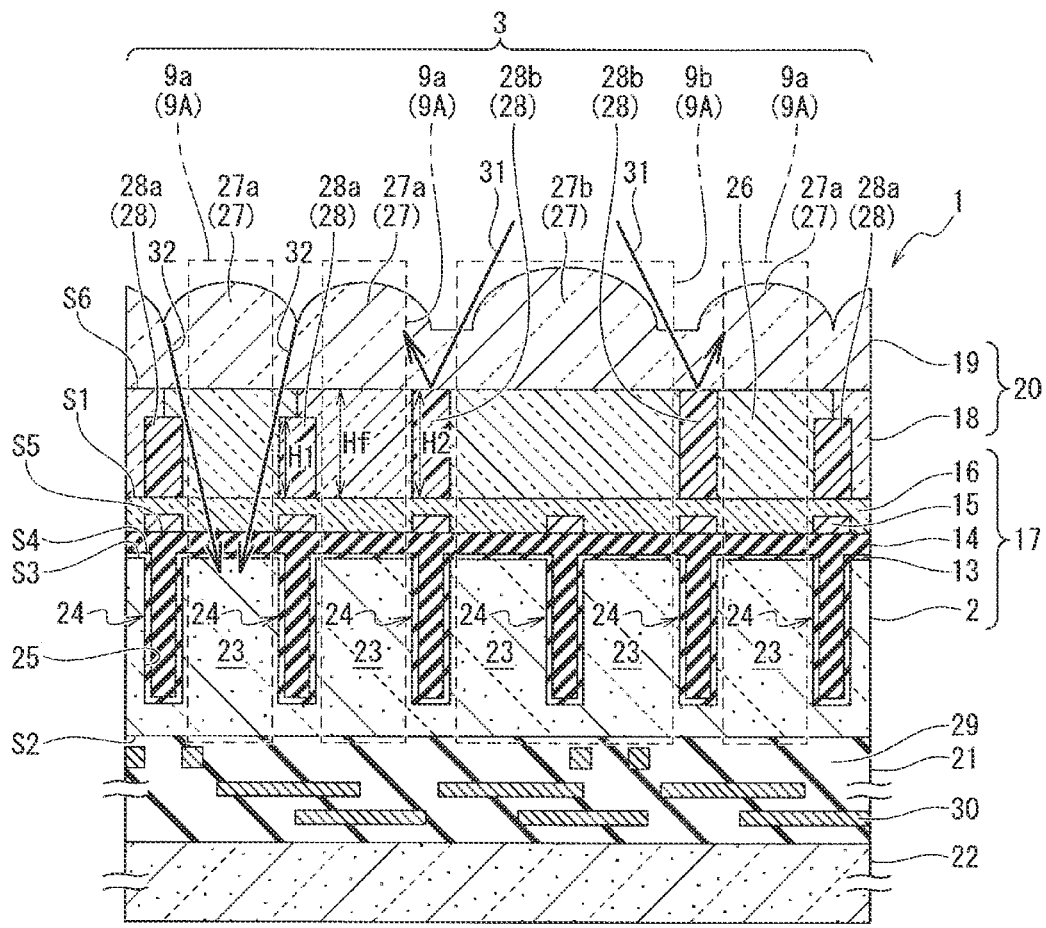
FIG. 2A is a diagram showing a cross-sectional configuration of a pixel region taken along the line A-A in FIG. 1.

FIG. 2A is a diagram showing a cross-sectional configuration of the pixel region 3 of the solid-state imaging device 1.

As shown in FIG. 2A, the solid-state imaging device 1 includes a light receiving layer 17 obtained by stacking the substrate 2, a fixed charge film 13, an insulation film 14, the light-shielding film 15, and a flattening film 16 in this order. Further, a light collection layer 20 obtained by stacking a color filter layer 18 and an on-chip lens layer 19 in this order is formed on a surface of the light receiving layer 17 on the side of the flattening film 16 (hereinafter, referred to also as a "back surface S1 side"). Further, a wiring layer 21 and a support substrate 22 are stacked in this order on a surface of the light receiving layer 17 on the side of the substrate 2 (hereinafter, referred to also as a "front surface S2 side").

The substrate 2 includes, for example, a semiconductor substrate formed of silicon (Si) to form the pixel region 3. In the pixel region 3, the plurality of pixels 9 (including the photoelectric conversion units 23) is arranged in a two-dimensional matrix. The photoelectric conversion units 23 each have a p-type semiconductor region and an n-type semiconductor region and constitute a photodiode by the p-n junction between them. Each of the photoelectric conversion units 23 generates and accumulates a signal corresponding to the amount of incident light on the photoelectric conversion unit 23.

Figure 2B:
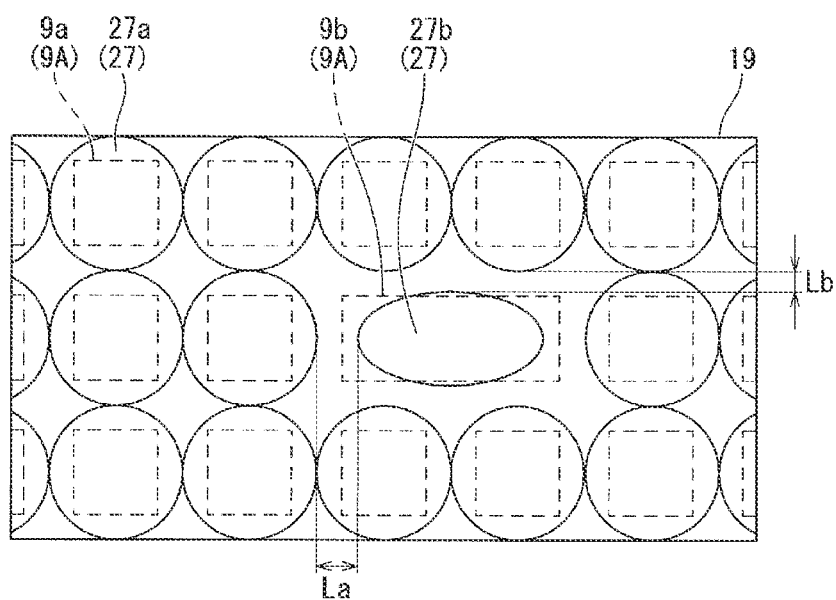
FIG. 2B is a diagram showing a planar configuration of the pixel region, which is obtained by enlarging a B region in FIG. 1.

The respective photoelectric conversion units 23 (pixels 9) form a plurality of structures (hereinafter, referred to also as "pixel units 9A") including components such as an on-chip lens 27, a color filter 26, and the photoelectric conversion unit 23. As shown in FIG. 2A and FIG. 2B, the plurality of pixel units 9A includes a first pixel unit 9a and a second pixel unit 9b, the first pixel unit 9a including an on-chip lens 27a of a predetermined size, the second pixel unit 9b including an on-chip lens 27b of a size larger than the predetermined size.

As the first pixel unit 9a, for example, a pixel unit having a 1×1 OCL structure that includes one photoelectric conversion unit 23 for one on-chip lens 27a can be employed. Each of the pixel units having a 1×1 OCL structure is arranged in a two-dimensional matrix and functions as an imaging pixel. Further, as the second pixel unit 9b, for example, a pixel unit having a 2×1 OCL structure or a 1×2 OCL structure that includes a plurality of photoelectric conversion units 23 for one on-chip lens 27b can be employed. Each of the pixel units having a 2×1 OCL structure or a 1×2 OCL structure is separately disposed instead of two first pixel units 9a inside the two-dimensional matrix in which the first pixel units 9a are arrayed, and functions as a phase-difference detection pixel. The phase-difference detection pixel is a pixel for detecting a phase difference used for an image plane phase difference AF. FIG. 2A illustrates a case where a pixel unit having a 2×1 OCL structure that includes two photoelectric conversion units 23 adjacent to each other in the row direction for one on-chip lens 27b.

Note that although an example in which the second pixel unit 9b has a 2×1 OCL structure that includes two photoelectric conversion units 23 adjacent to each other in the row direction for one on-chip lens 27b has been shown in the first embodiment, another configuration may be employed. For example, the second pixel unit 9b may have a 1×2 OCL structure that includes two photoelectric conversion units 23 adjacent to each other in the column direction for one on-chip lens 27b. Further, the number of photoelectric conversion units 23 does not necessarily need to be "2", and, for example, the second pixel unit 9b may have a 2×2 OCL structure that includes four photoelectric conversion units 23 of 2 rows×2 columns for one on-chip lens 27.

Further, a pixel separation unit 24 is formed between adjacent photoelectric conversion units 23. The pixel separation unit 24 is formed in a lattice shape on the substrate 2 so as to surround the respective photoelectric conversion units 23. The pixel separation unit 24 includes a bottomed trench portion 25 extending in the thickness direction from a back surface S3 side of the substrate 2. The trench portion 25 is formed in a lattice shape on the substrate 2 so as to surround the respective photoelectric conversion units 23. The fixed charge film 13 and the insulation film 14 are embedded in the trench portion 25. Further, a metal film may be embedded in the insulation film 14. The pixel separation unit 24 blocks light between the adjacent photoelectric conversion units 23 to suppress the optical color mixing.

The fixed charge film 13 covers the entire back surface S3 of the substrate 2 and the inside of the trench portion 25 in a continuous manner. Further, the insulation film 14 covers an entire back surface S4 of the fixed charge film 13 and the inside of the trench portion 25 in a continuous manner. Further, the light-shielding film 15 is formed in a lattice shape including a plurality of openings that opens the respective plurality of photoelectric conversion units 23 on the light incident surface side and covers part of a back surface S5 of the insulation film 14 (part of the light incident surface). Further, the flattening film 16 covers the entire back surface S5 of the insulation film 14 including the light-shielding film 15 in a continuous manner such that the back surface S1 of the light receiving layer 17 is a flat surface without recesses and projections.

The color filter layer 18 is formed on the back surface S1 of the flattening film 16 (on the light incident surface) and includes a plurality of color filters 26 disposed corresponding to the pixel units 9A (the first pixel unit 9a and the second pixel unit 9b). Each of the color filters 26 causes light of a specific wavelength to be transmitted therethrough and causes the transmitted light to enter the photoelectric conversion unit 23. As the color filter 26 corresponding to the first pixel unit 9a, a color filter that causes red light to be transmitted therethrough, a color filter that causes green light to be transmitted therethrough, or a color filter that causes blue light to be transmitted therethrough is used. These color filters form a Bayer array. Further, as the color filter 26 corresponding to the second pixel unit 9b, a color filter that causes green light to be transmitted therethrough is used.

Figure 13A:
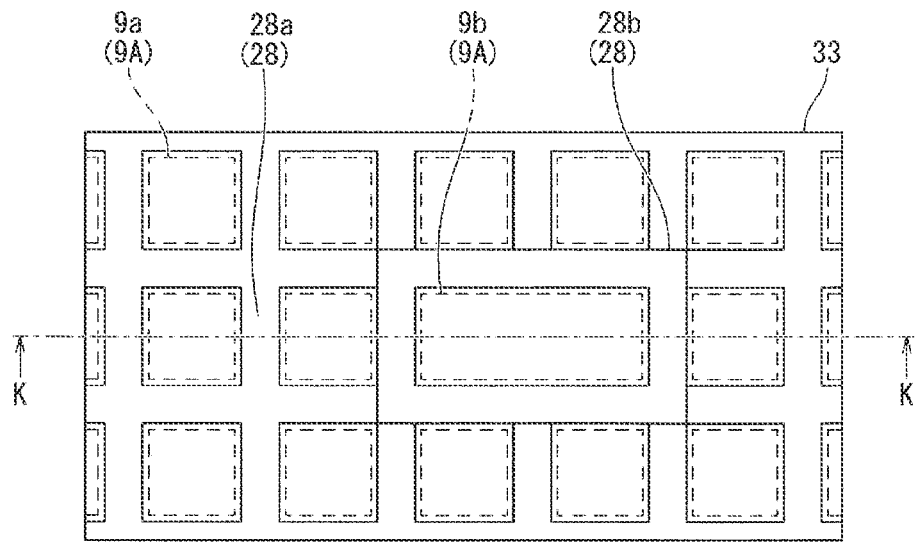
FIG. 13A is a diagram showing a planar configuration of the pixel region in the production process of the solid-state imaging device.
Figure 14A:
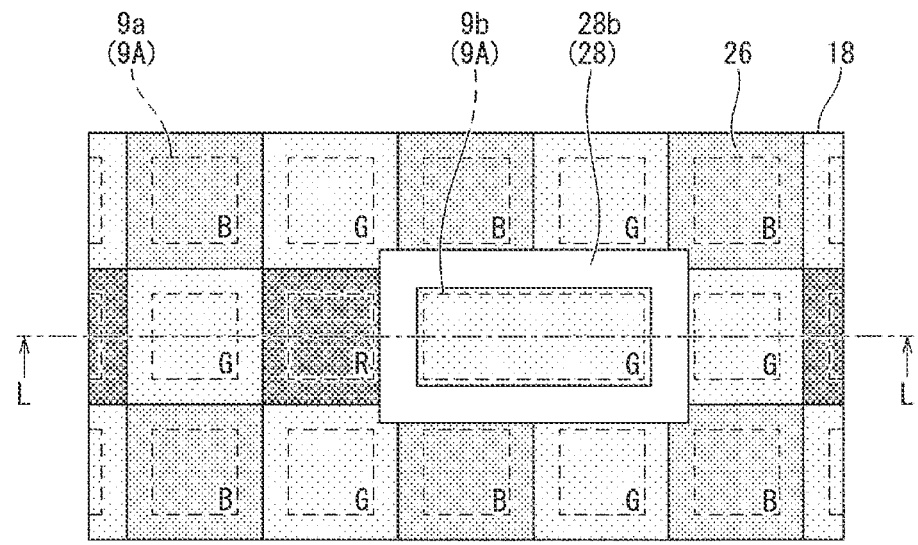
FIG. 14A is a diagram showing a planar configuration of the pixel region in the production process of the solid-state imaging device.

Further, an inter-CF light-shielding portion 28 is formed between adjacent color filters 26. The inter-CF light-shielding portion 28 is formed in a lattice shape on the back surface S1 of the flattening film 16, i.e., the same surface as the surface on which the color filter 26 is formed, so as to surround the respective color filters 26 of the plurality of pixel units 9A (the first pixel unit 9a and the second pixel unit 9b) (the plane shape of the inter-CF light-shielding portion 28 is shown in FIG. 13A). In other words, it can be said that the inter-CF light-shielding portion 28 is formed on a surface that is located on the light incident surface side of the photoelectric conversion unit 23 and parallel to the light incident surface of the photoelectric conversion unit 23. Further, a height H2 of the inter-CF light-shielding portion 28 surrounding the color filter 26 of the second pixel unit 9b (hereinafter, referred to also as a "second inter-CF light-shielding portion 28b". The plane shape of the second inter-CF light-shielding portion 28b is shown in FIG. 14A.) and a height H1 of the inter-CF light-shielding portion 28 between the color filters 26 of the first pixel units 9a (hereinafter, referred to also as a "first inter-CF light-shielding portion 28a") are different from each other. Specifically, the height H2 of the second inter-CF light-shielding portion 28b is larger than the height H1 of the first inter-CF light-shielding portion 28a (H2>H1). FIG. 2A illustrates a case where the height H2 of the second inter-CF light-shielding portion 28b is the same as a height Hf of the color filter 26 (H2=Hf) and the height H1 of the first inter-CF light-shielding portion 28a is approximately 70% to 80% of the height Hf of the color filter 26 (H1=0.7 Hf to 0.8 Hf). As the material of the inter-CF light-shielding portion 28, for example, a material capable of blocking light, such as a material that reflects light and a material that absorbs light, can be employed. Examples of the material include a low refractive index material (e.g., a low refractive index resin) having a refractive index lower than those of the on-chip lens 27 and the color filter 26, metal containing tungsten (W) and aluminum (Al), and a resin containing carbon black or the like.

Further, the on-chip lens layer 19 is formed on a back surface S6 side (light incident surface side) of the color filter layer 18 and includes a plurality of on-chip lenses 27 disposed corresponding to the pixel units 9A (the first pixel unit 9a and the second pixel unit 9b). As a result, the first pixel unit 9a includes one on-chip lens 27 (hereinafter, referred to also as the "on-chip lens 27a") for one photoelectric conversion unit 23. Further, the second pixel unit 9b includes one on-chip lens 27 (hereinafter, referred to also as the "on-chip lens 27b") for two photoelectric conversion units 23. Regarding the size of the on-chip lens 27a of the first pixel unit 9a, the size in the row direction is the same as the size in the column direction. Further, the size of the on-chip lens 27b of the second pixel unit 9b is a size twice and one time the size of the on-chip lens 27a of the first pixel unit 9a in the row direction and in the column direction, respectively. Note that in the case where the second pixel unit 9b has a 1×2 OCL structure that includes two photoelectric conversion units 23 adjacent to each other in the column direction for one on-chip lens 27a, the size of the on-chip lens 27b of the second pixel unit 9b may be a size one time and twice the size of the on-chip lens 27a of the first pixel unit 9a in the row direction and in the column direction, respectively. The on-chip lenses 27a and 27b each have a projecting lens surface on the light incident surface side and a flat surface parallel to the light incident surface of the substrate 2 on the color filter 26 side, thereby forming a convex-flat lens. The on-chip lenses 27a and 27b each collect incident light into the photoelectric conversion unit 23 at the center of the pixel unit.

Figure 3:
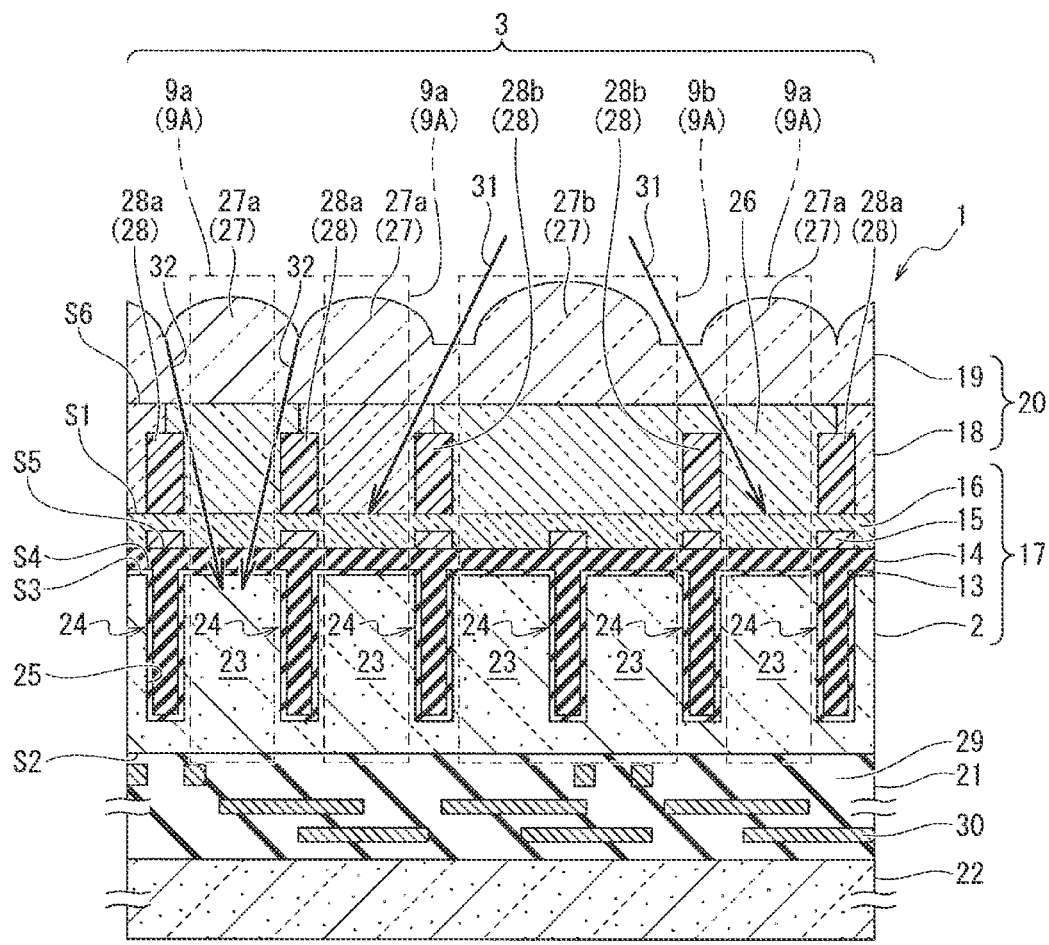
FIG. 3 is a diagram showing a cross-sectional configuration of a pixel region of an existing solid-state imaging device in the case where an inter-CF light-shielding portion has a low height.
Figure 4:
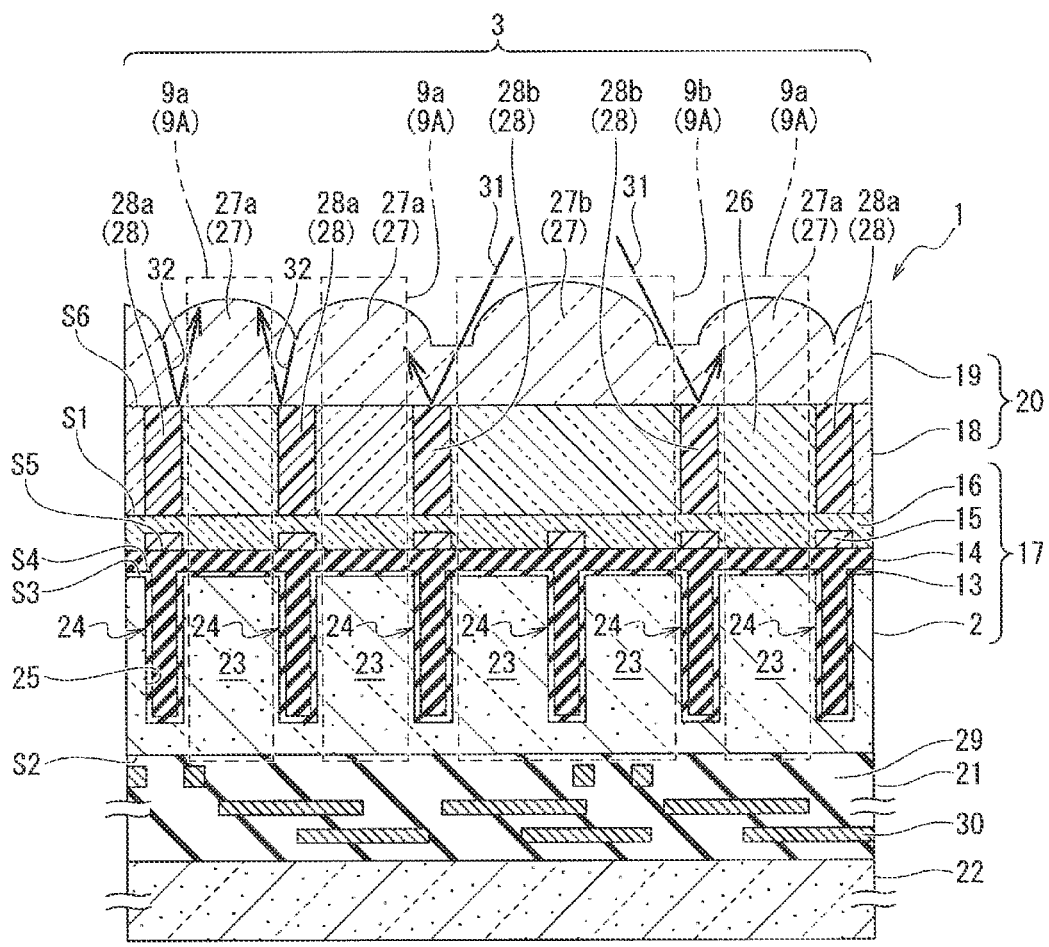
FIG. 4 is a diagram showing a cross-sectional configuration of a pixel region of an existing solid-state imaging device in the case where an inter-CF light-shielding portion has a high height.

Here, as described above, there is a possibility that a flat boundary region that does not contribute to collection of light is formed between the edge of the on-chip lens 27b of the second pixel unit 9b and the edge of the on-chip lens 27a of the adjacent first pixel unit 9a. Therefore, there is a possibility that in the case where incident light 31 that travels obliquely from the second pixel unit 9b side to the first pixel unit 9a side enters the boundary region, the oblique incident light 31 travels straight without being collected by the on-chip lens 27b. Therefore, there is a possibility that in the case where the height of the inter-CF light-shielding portion 28 is made smaller in the entire region of the pixel region 3 (H1=H2<Hf) as shown in FIG. 3, for example, the incident light 31 that has traveled straight is not blocked by the second inter-CF light-shielding portion 28b and enters the color filter 26 of the first pixel unit 9a to cause optical color mixing. Further, there is a possibility that in the case where the height of the inter-CF light-shielding portion 28 is made larger in the entire region of the pixel region 3 (H1=H2=Hf) as shown in FIG. 4, for example, incident light 32 that has been transmitted through the on-chip lens 27a of the first pixel unit 9a strikes the first inter-CF light-shielding portion 28a on the light incident surface side and is reflected thereby in the first pixel unit 9a, the amount of incident light that enters the photoelectric conversion unit 23 is reduced, and the sensitivity is reduced.

Meanwhile, in the first embodiment, since the following relationship: the height H2 of the second inter-CF light-shielding portion 28b>the height H1 of the first inter-CF light-shielding portion 28a is established and the height H2 of the second inter-CF light-shielding portion 28b is large as shown in FIG. 2A, it is possible to cause, in the first pixel unit 9a (pixel unit of an imaging pixel) adjacent to the second pixel unit 9b (pixel unit of a phase-difference detection pixel), the incident light 31 that has been transmitted through the boundary region between the edge of the on-chip lens 27b of the second pixel unit 9b and the edge of the on-chip lens 27 of the first pixel unit 9a to be reflected on the light incident surface of the second inter-CF light-shielding portion 28b and suppress optical color mixing. Further, since the height H1 of the first inter-CF light-shielding portion 28a is small, it is possible to prevent, in the first pixel unit 9a, the incident light 32 that has been transmitted through the on-chip lens 27a from being reflected on the light incident surface side of the first inter-CF light-shielding portion 28a. Therefore, it is possible to suppress the reduction in the amount of incident light onto the photoelectric conversion unit 23 of the first pixel unit 9a and improve the sensitivity.

The wiring layer 21 is formed on the front surface S2 side of the substrate 2 and includes an interlayer insulating film 29 and wires 30 stacked in a plurality of layers via the interlayer insulating film 29. Then, the wiring layer 21 drives the pixel transistor constituting each pixel 9 via the plurality of layers of wires 30.

The support substrate 22 is formed on a surface of the wiring layer 21 on the side opposite to the side facing the substrate 2. The support substrate 22 is a substrate for achieving the strength of the substrate 2 in the production stage of the solid-state imaging device 1. As the material of the support substrate 22, for example, silicon (Si) can be used.

1-3 Method of Producing Solid-State Imaging Device

Next, a method of producing a solid-state imaging device will be described.

Figure 5A:
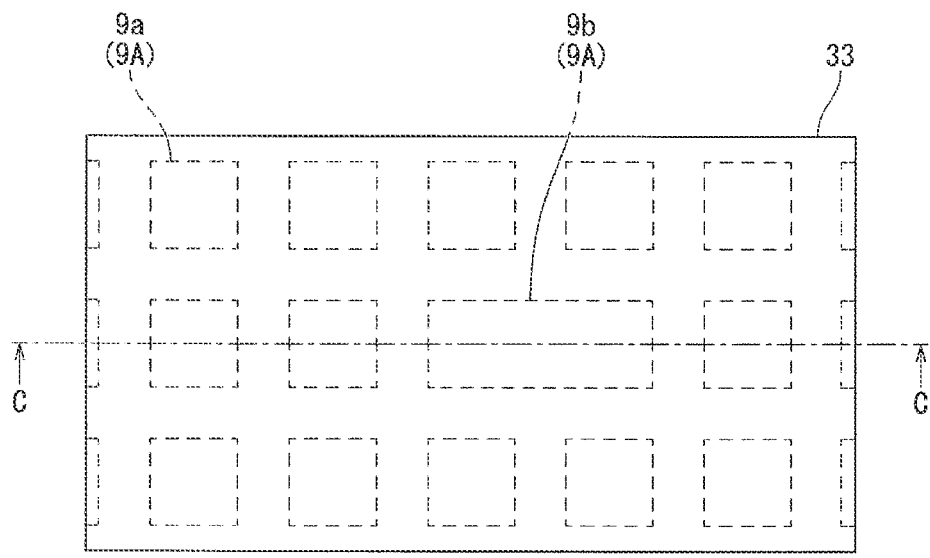
FIG. 5A is a diagram showing a planar configuration of a pixel region in a production process of a solid-state imaging device.
Figure 5B:
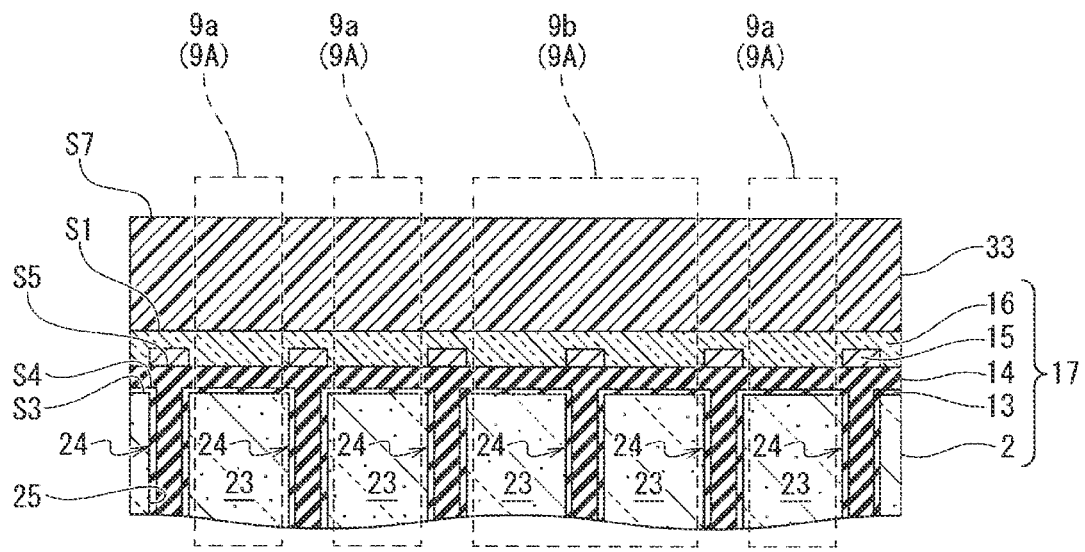
FIG. 5B is a diagram showing a cross-sectional configuration of the pixel region taken along the line C-C in FIG. 5A.

First, as shown in FIG. 5A and FIG. 5B, after forming the photoelectric conversion unit 23, the pixel separation unit 24, the insulation film 14, the light-shielding film 15, the flattening film 16, and the like on the substrate 2, a thick film (hereinafter, referred to also as an "inter-CF light-shielding film 33" formed of the material of the inter-CF light-shielding portion 28 is deposited on the back surface S1 of the flattening film 16. As the deposition method of the inter-CF light-shielding film 33, for example, a spin coat method or a CVD method can be employed. The thickness of the inter-CF light-shielding film 33 is, for example, the same as the height of the second inter-CF light-shielding portion 28b.

Figure 6A:
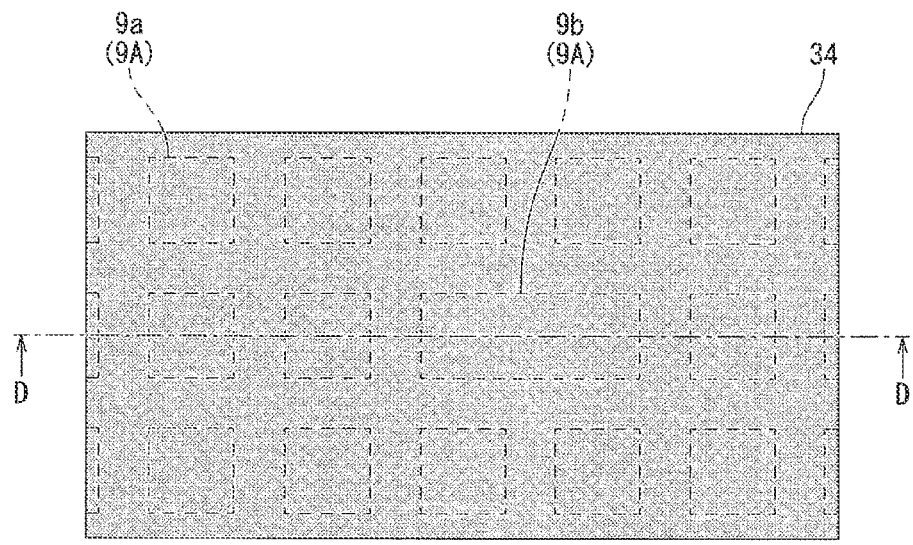
FIG. 6A is a diagram showing a planar configuration of the pixel region in the production process of the solid-state imaging device.
Figure 6B:
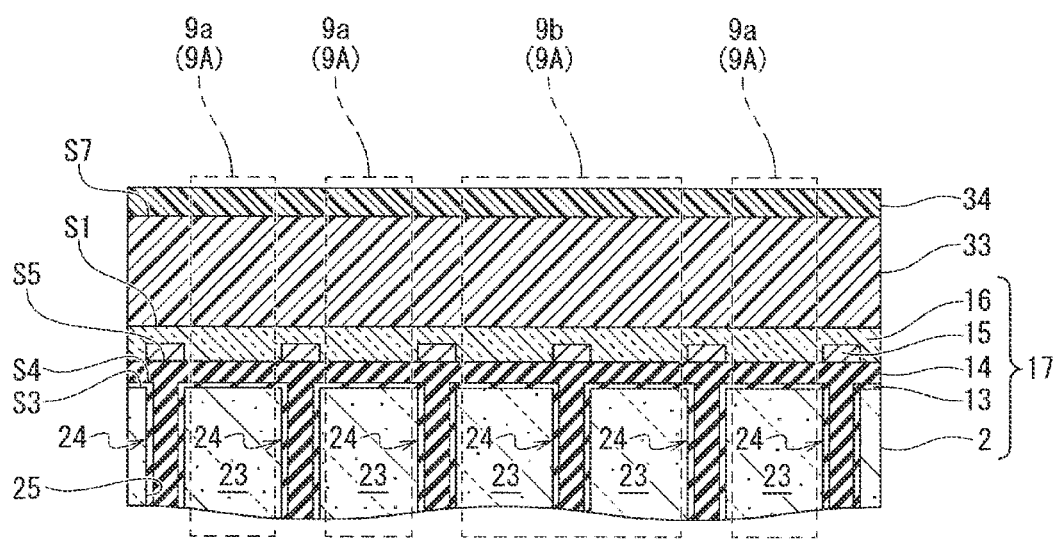
FIG. 6B is a diagram showing a cross-sectional configuration of the pixel region taken along the line D-D in FIG. 6A.
Figure 7A:
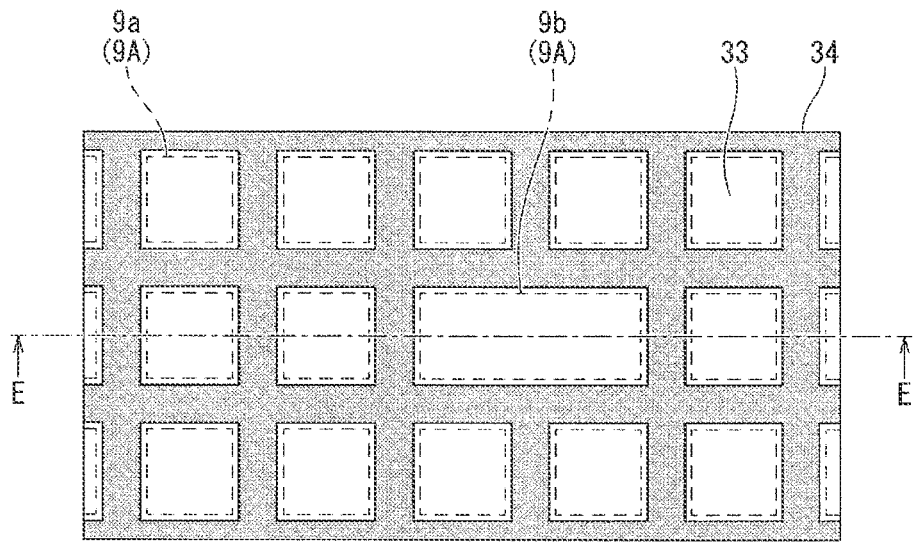
FIG. 7A is a diagram showing a planar configuration of the pixel region in the production process of the solid-state imaging device.
Figure 7B:
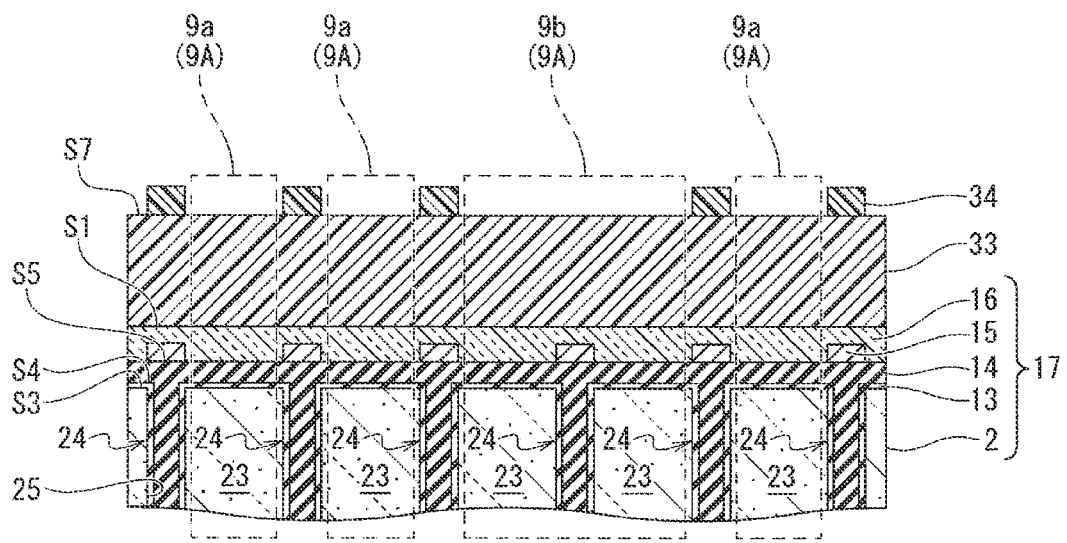
FIG. 7B is a diagram showing a cross-sectional configuration of the pixel region taken along the line E-E in FIG. 7A.
Figure 8A:
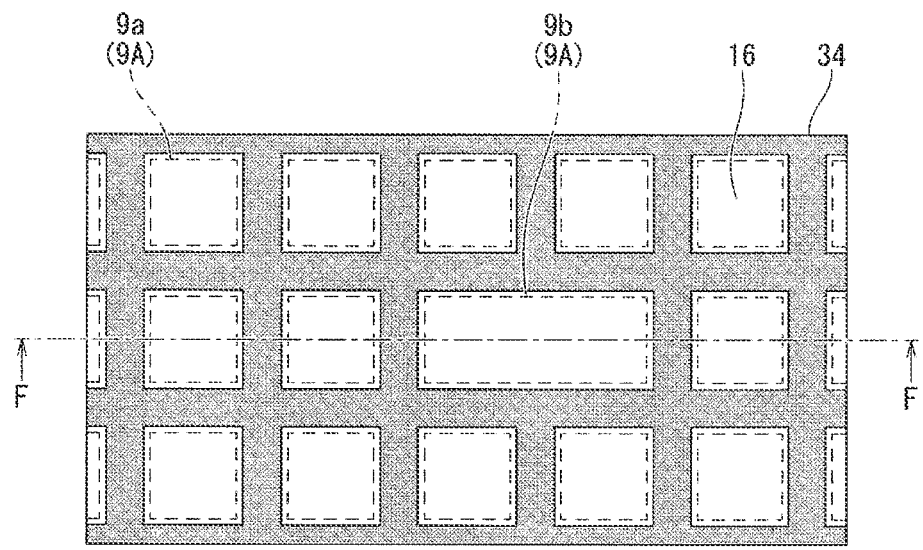
FIG. 8A is a diagram showing a planar configuration of the pixel region in the production process of the solid-state imaging device.
Figure 8B:
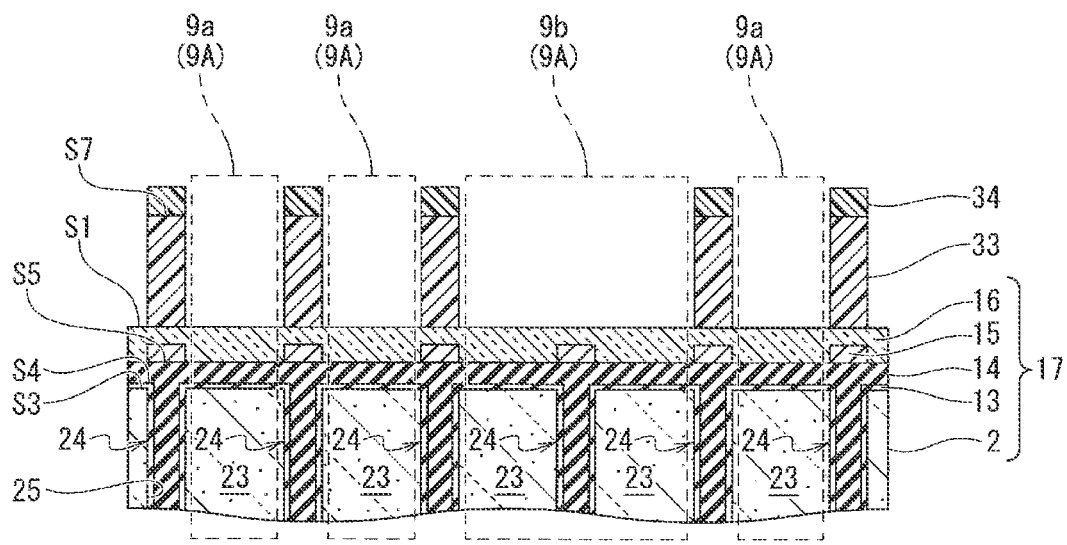
FIG. 8B is a diagram showing a cross-sectional configuration of the pixel region taken along the line F-F in FIG. 8A.
Figure 9A:
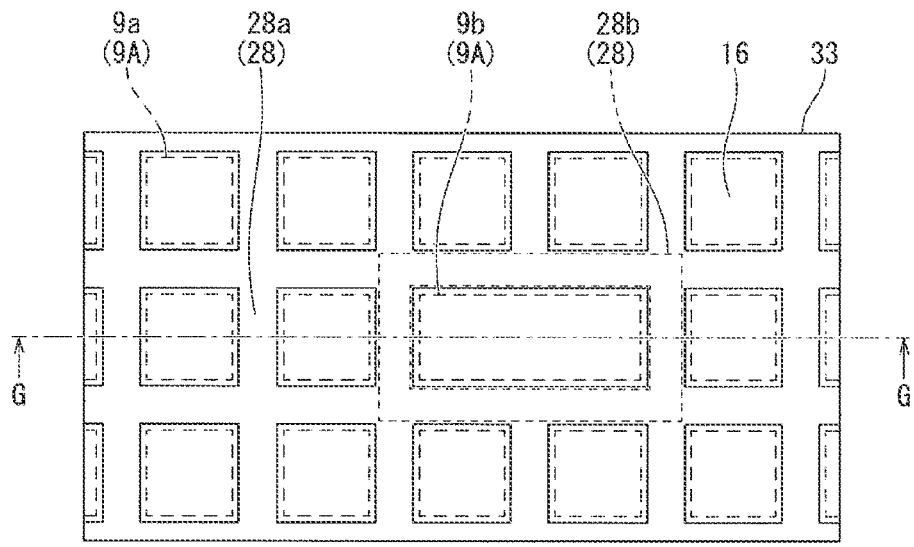
FIG. 9A is a diagram showing a planar configuration of the pixel region in the production process of the solid-state imaging device.
Figure 9B:
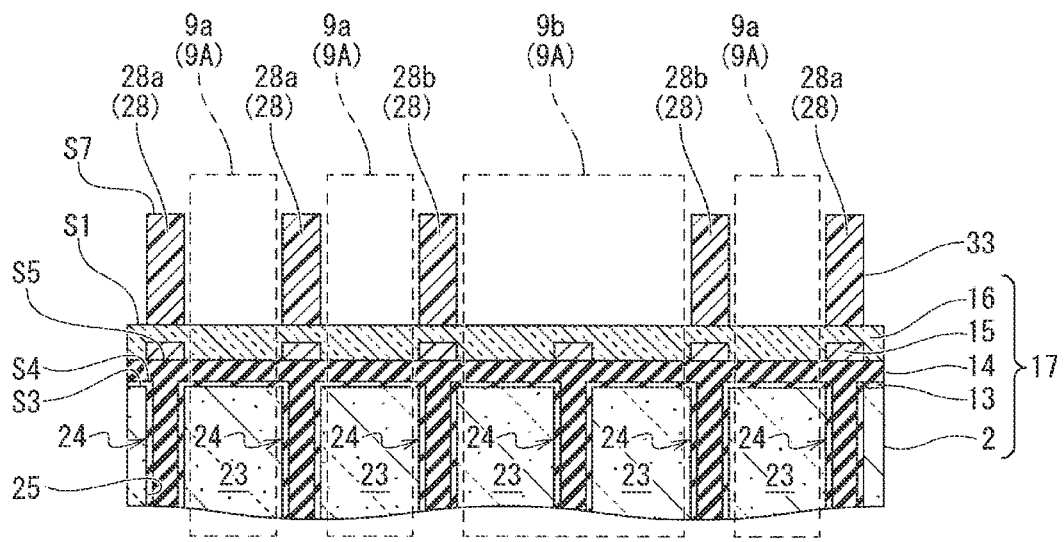
FIG. 9B is a diagram showing a cross-sectional configuration of the pixel region taken along the line G-G in FIG. 9A.

Subsequently, a resist film 34 is deposited on a back surface S7 of the inter-CF light-shielding film 33 as shown in FIG. 6A and FIG. 6B, and a pattern is formed on the formed resist film 34 by photolithography as shown in FIG. 7A and FIG. 7B. In the pattern formation, a plurality of openings (rectangular openings in FIG. 7A) is formed on the resist film 34 such that only the part along the forming position of the inter-CF light-shielding portion 28 (the first inter-CF light-shielding portion 28a and the second inter-CF light-shielding portion 28b) is left. Subsequently, as shown in FIG. 8A and FIG. 8B, the inter-CF light-shielding film 33 is etched from the back surface S7 side using, as an etching mask, the resist film 34 on which a plurality of openings has been formed. By the etching, openings having the same lateral cross-sectional shapes as those of the openings of the etching mask (resist film 34) are formed on the inter-CF light-shielding film 33. The depth of the respective openings is a depth reaching the interface between the inter-CF light-shielding film 33 and the flattening film 16. Subsequently, as shown in FIG. 9A and FIG. 9B, the etching mask is removed from the inter-CF light-shielding film 33. As a result, the first inter-CF light-shielding portion 28a and the second inter-CF light-shielding portion 28b are formed. At this time point, the height H1 of the first inter-CF light-shielding portion 28a is the same as the height H2 of the second inter-CF light-shielding portion 28b (H1=H2).

Figure 10A:
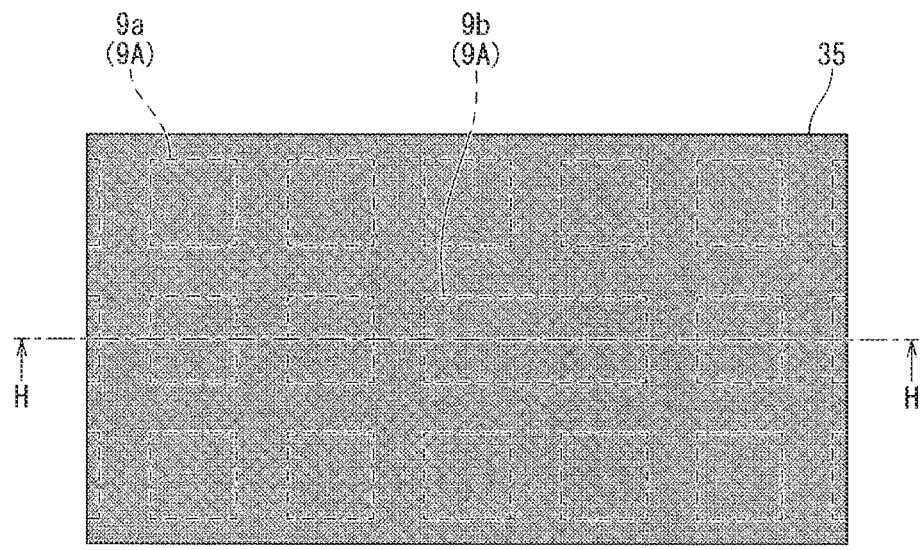
FIG. 10A is a diagram showing a planar configuration of the pixel region in the production process of the solid-state imaging device.
Figure 10B:
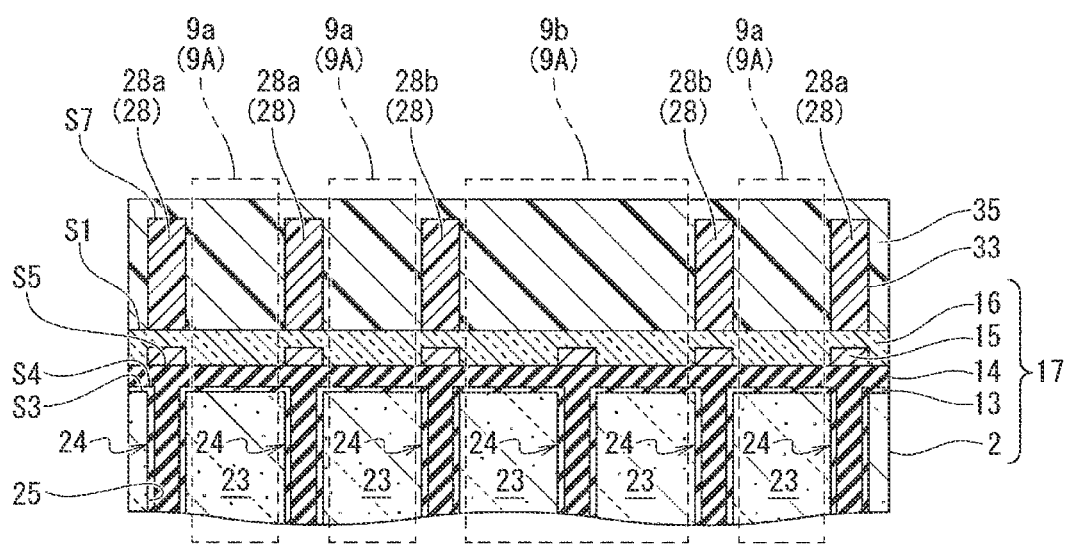
FIG. 10B is a diagram showing a cross-sectional configuration of the pixel region taken along the line H-H in FIG. 10A.
Figure 11A:
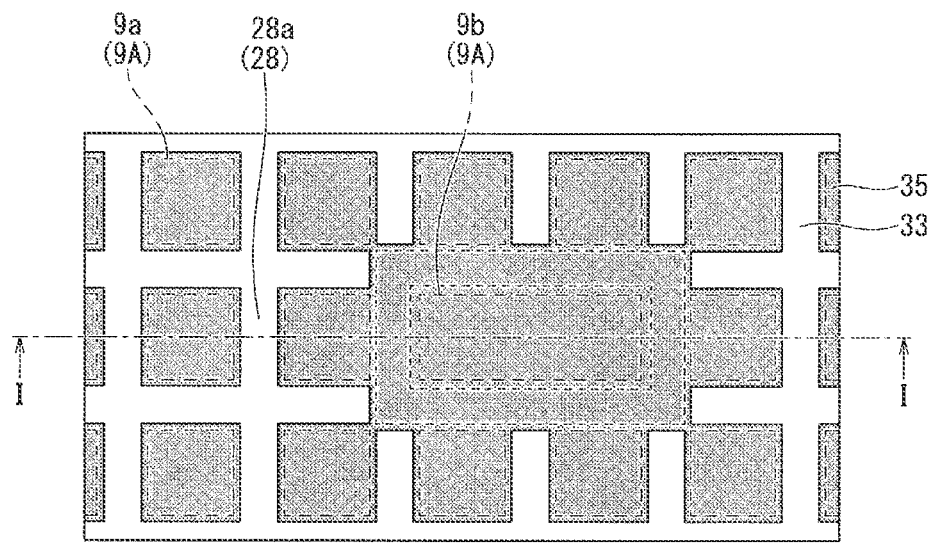
FIG. 11A is a diagram showing a planar configuration of the pixel region in the production process of the solid-state imaging device.
Figure 11B:
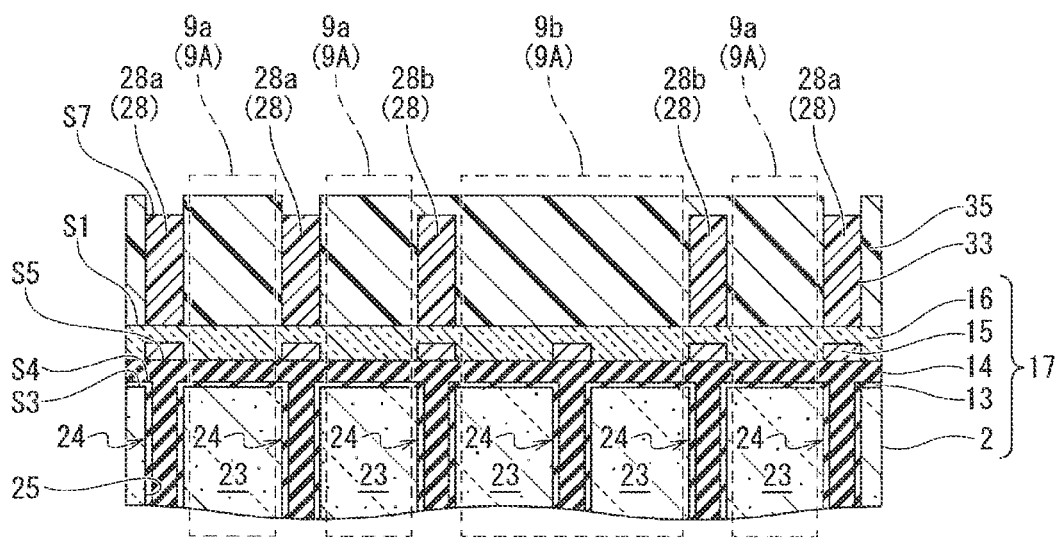
FIG. 11B is a diagram showing a cross-sectional configuration of the pixel region taken along the line I-I in FIG. 11A.
Figure 12A:
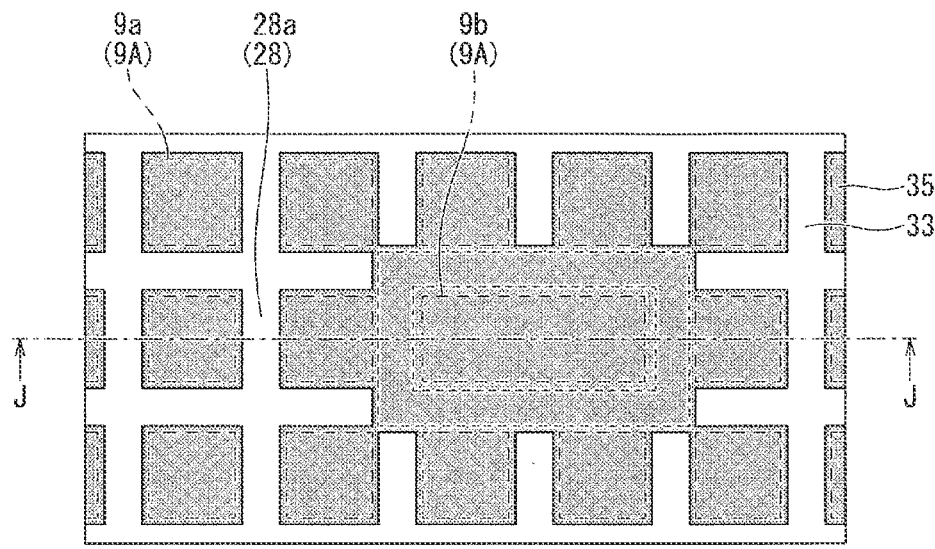
FIG. 12A is a diagram showing a planar configuration of the pixel region in the production process of the solid-state imaging device.
Figure 12B:
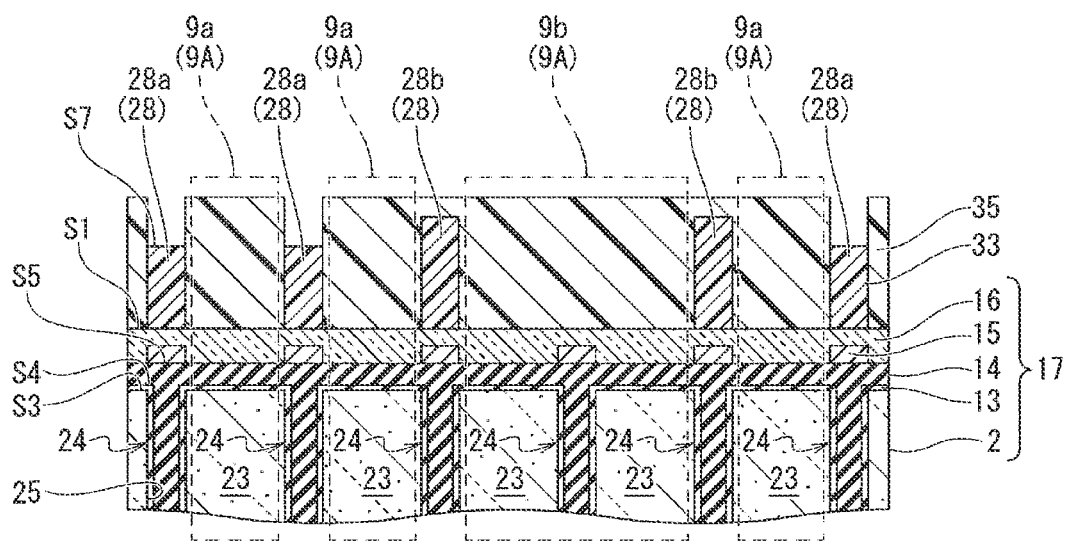
FIG. 12B is a diagram showing a cross-sectional configuration of the pixel region taken along the line J-J in FIG. 12A.
Figure 13B:
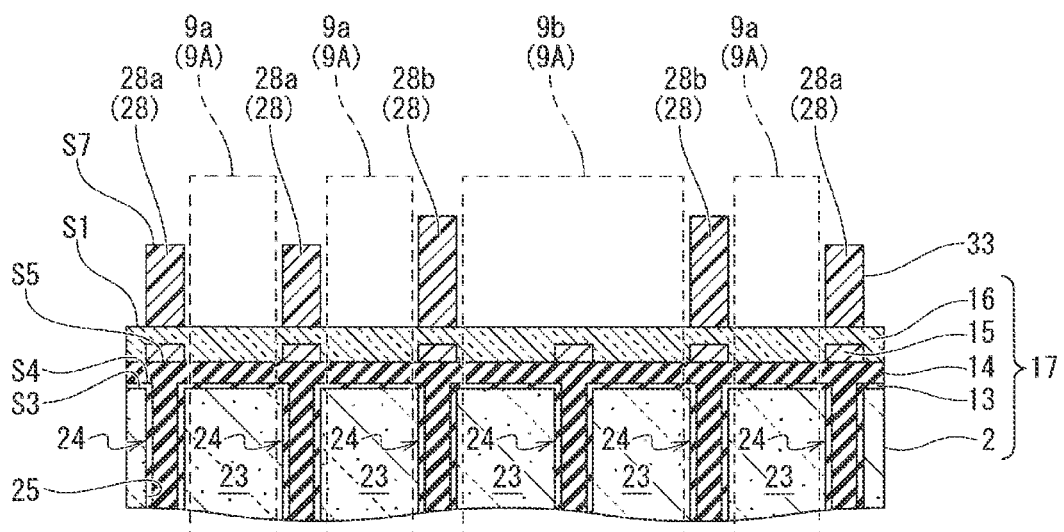
FIG. 13B is a diagram showing a cross-sectional configuration of the pixel region taken along the line K-K in FIG. 13A.

Subsequently, a resist film 35 is deposited on the back surface S1 of the flattening film 16 such that the entire inter-CF light-shielding film 33 is covered as shown in FIG. 10A and FIG. 10B, and a pattern is formed on the formed resist film by photolithography as shown in FIG. 11A and FIG. 11B. In the pattern formation, openings along the first inter-CF light-shielding portion 28a are formed on the resist film 35 such that the back surface S7 of the second inter-CF light-shielding portion 28b is not exposed and only the back surface S7 of the first inter-CF light-shielding portion 28a is exposed. Subsequently, as shown in FIG. 12A and FIG. 12B, the back surface S7 side of the first inter-CF light-shielding portion 28a is etched using, as an etching mask, the resist film 35 on which openings have been formed. By the etching, the height H1 of the first inter-CF light-shielding portion 28a is made smaller than the height H2 of the second inter-CF light-shielding portion 28b. Subsequently, as shown in FIG. 13A and FIG. 13B, the etching mask (resist film 34) is removed from the inter-CF light-shielding film 33.

Figure 14B:
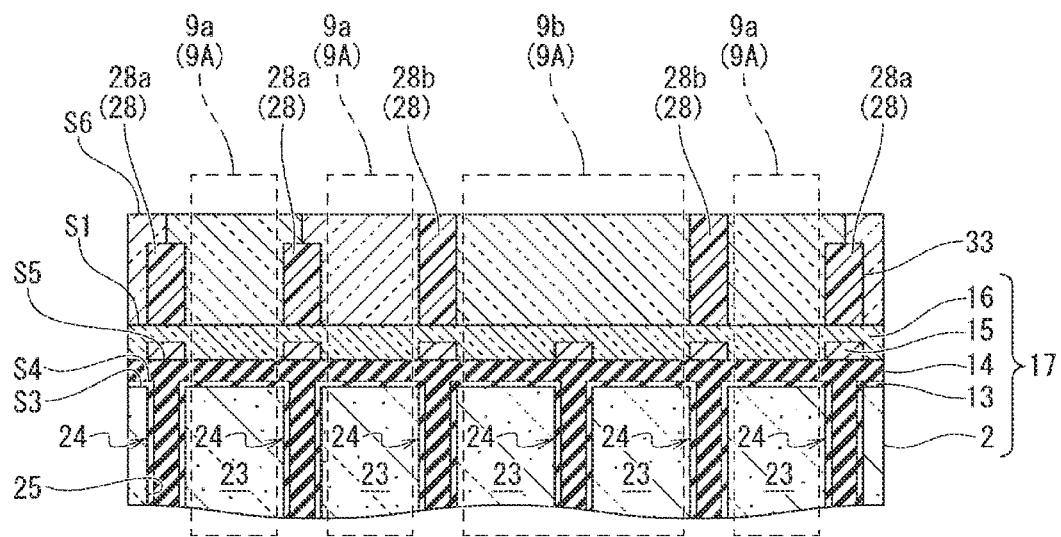
FIG. 14B is a diagram showing a cross-sectional configuration of the pixel region taken along the line L-L in FIG. 14A.

Subsequently, as shown in FIG. 14A and FIG. 14B, the color filter layer 18 is formed on the back surface S1 of the flattening film 16. Subsequently, the on-chip lens layer 19 is formed on the back surface S6 of the color filter layer 18. As a result, the solid-state imaging device 1 shown in FIG. 2A is completed.

As described above, in the solid-state imaging device 1 according to the first embodiment, the plurality of pixel units 9A includes the first pixel unit 9a (pixel unit of an imaging pixel) and the second pixel unit 9b (pixel unit of a phase-difference detection pixel), the first pixel unit 9a including the on-chip lens 27a of a predetermined size, the second pixel unit 9b including the on-chip lens 27b of a size larger than the predetermined size. Further, the height H2 of the inter-CF light-shielding portion 28 surrounding the color filter 26 of the second pixel unit 9b (second inter-CF light-shielding portion 28b) is made larger than the height H1 of the inter-CF light-shielding portion 28 between the color filters 26 of the first pixel units 9a (first inter-CF light-shielding portion 28a) (H2>H1).

By the relationship of H2>H1, since the height H2 of the second inter-CF light-shielding portion 28b is large, it is possible to cause, in the first pixel unit 9a adjacent to the second pixel unit 9b, the incident light 31 that has been transmitted through the boundary region between the edge of the on-chip lens 27b of the second pixel unit 9b and the edge of the on-chip lens 27 of the first pixel unit 9a to be reflected on the light incident surface of the second inter-CF light-shielding portion 28b and suppress optical color mixing.

Further, since the height H1 of the first inter-CF light-shielding portion 28a is small, it is possible to prevent, in the first pixel unit 9a, the incident light 32 that has been transmitted through the on-chip lens 27a of the first pixel unit 9a from being reflected on the light incident surface of the first inter-CF light-shielding portion 28a. Therefore, it is possible to suppress the reduction in the amount of incident light onto the photoelectric conversion unit 23 of the first pixel unit 9a and improve the sensitivity. Therefore, it is possible to improve the sensitivity while suppressing optical color mixing and provide the solid-state imaging device 1 capable of acquiring an image with higher image quality.

2. Second Embodiment: Solid-State Imaging Device

Figure 15:
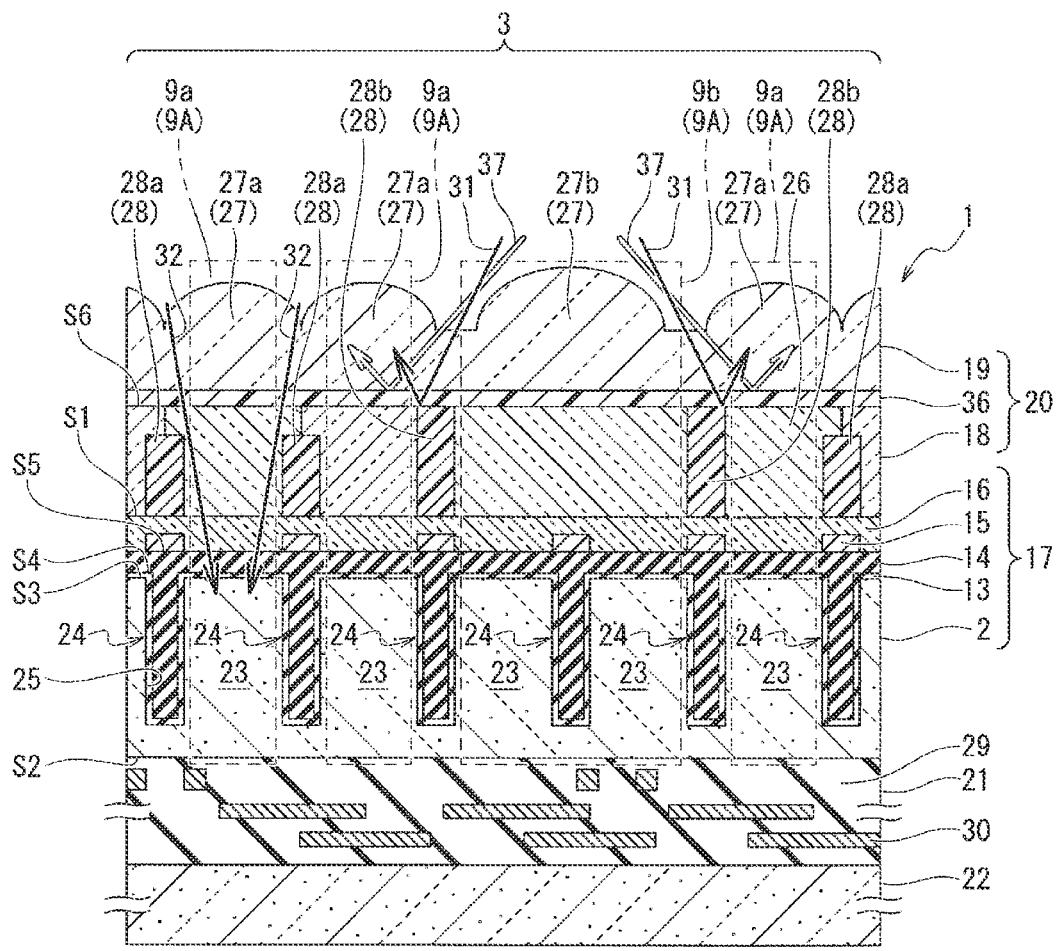
FIG. 15 is a diagram showing a cross-sectional configuration of a pixel region of a solid-state imaging device according to a second embodiment.

Next, the solid-state imaging device 1 according to a second embodiment will be described. The solid-state imaging device 1 according to the second embodiment is obtained by changing part of the configuration of the solid-state imaging device 1 according to the first embodiment. Since the configuration of the entire solid-state imaging device 1 according to the second embodiment is similar to that in FIG. 1, illustration thereof is omitted. FIG. 15 is a cross-sectional configuration diagram of main parts of the solid-state imaging device 1 according to the second embodiment. In FIG. 15, portions corresponding to those in FIG. 2A will be denoted by the same reference symbols and overlapping description is omitted.

The solid-state imaging device 1 according to the second embodiment is different from that according to the first embodiment in the layer configuration of the light collection layer 20. In the second embodiment, as shown in FIG. 15, the light collection layer 20 includes a low-refractive index layer 36 between the color filter layer 18 and the on-chip lens layer 19. The low-refractive index layer 36 is formed so as to cover the entire region of the back surface S6 (light incident surface) of the color filter layer 18. As the material of the low-refractive index layer 36, for example, a material having a refractive index lower than that of the on-chip lens 27 can be employed. Examples of the material having a low refractive index include a low refractive index resin.

By covering the entire region of the back surface S6 (light incident surface) of the color filter layer 18 with the low-refractive index layer 36, it is possible to cause, in the first pixel unit 9a adjacent to the second pixel unit 9b, incident light 37 that travels to the light incident surface of the photoelectric conversion unit 23 of the first pixel unit 9a, of incident light that is transmitted through the boundary region between the edge of the on-chip lens 27b of the second pixel unit 9b and the edge of the on-chip lens 27a of the first pixel unit 9a, to be reflected on the interface between the on-chip lens layer 19 (on-chip lens 27a) and the low-refractive index layer 36 and more appropriately suppress optical color mixing.

Further, with the configuration in which the low-refractive index layer 36 is formed in the entire region of the back surface S6 (light incident surface) of the color filter layer 18, it is possible to reduce the labor required for forming the low-refractive index layer 36 as compared with, for example, the method of forming the low-refractive index layer 36 on only part of the back surface S6 of the color filter layer 18.

3. Third Embodiment: Solid-State Imaging Device

Figure 16:
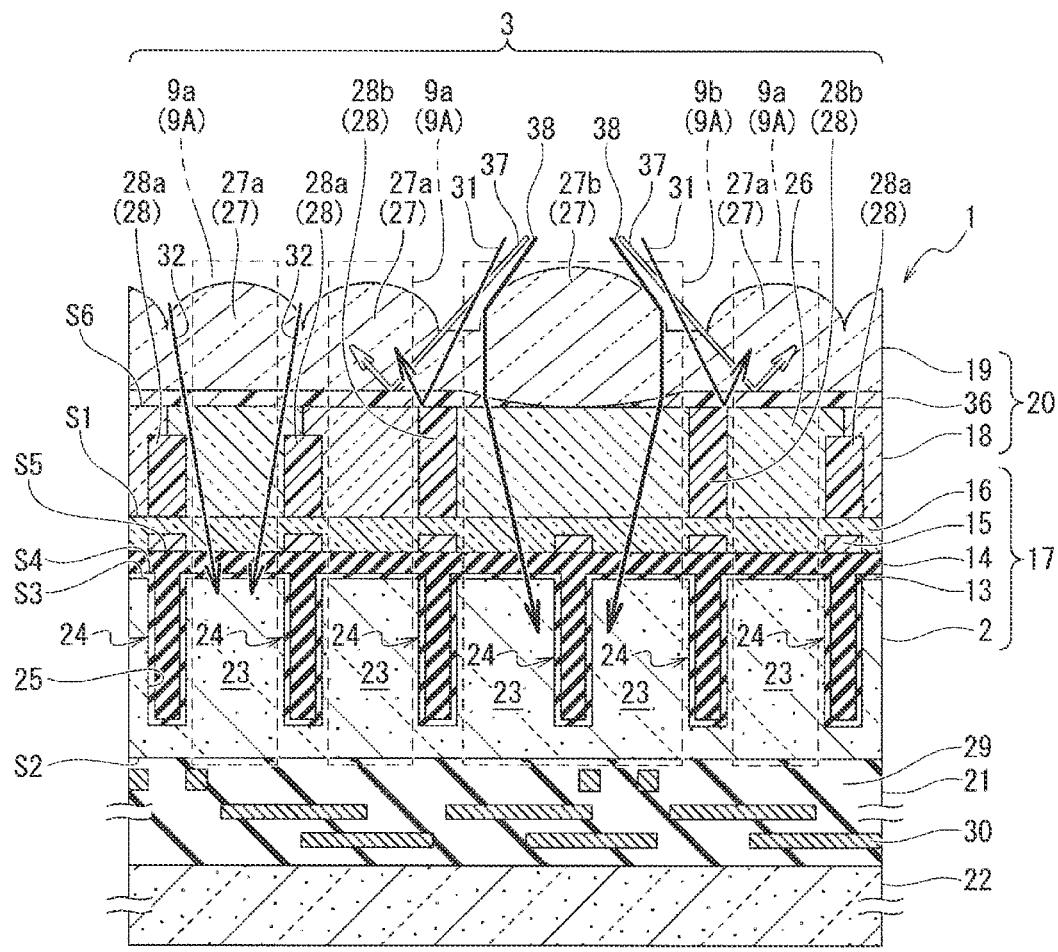
FIG. 16 is a diagram showing a cross-sectional configuration of a pixel region of a solid-state imaging device according to a third embodiment.

Next, the solid-state imaging device 1 according to a third embodiment will be described. The solid-state imaging device 1 according to the third embodiment is obtained by changing part of the configuration of the solid-state imaging device 1 according to the second embodiment. Since the configuration of the entire solid-state imaging device 1 according to the third embodiment is similar to that in FIG. 1, illustration thereof is omitted. FIG. 16 is a cross-sectional configuration diagram of main parts of the solid-state imaging device 1 according to the third embodiment. In FIG. 16, portions corresponding to those in FIG. 2A and FIG. 15 will be denoted by the same reference symbols and overlapping description is omitted.

The solid-state imaging device 1 according to the third embodiment is different from that according to the second embodiment in the shape of the low-refractive index layer 36. In the third embodiment, as shown in FIG. 16, the low-refractive index layer 36 has a parabolic shape in which a central portion of a region facing the on-chip lens 27b of the second pixel unit 9b is recessed toward a side of the color filter 26 such that the on-chip lens 27b has a projecting lens surface on a side of the low-refractive index layer 36. As a result, the on-chip lens 27b of the second pixel unit 9b forms a biconvex lens. As the lens surface, for example, a spherical surface or an aspherical surface can be employed. FIG. 16 illustrates a case where the size of the lens surface of the on-chip lens 27b on the low-refractive index layer 36 side is larger than the size of the lens surface on the light incident surface side. Further, a region of the low-refractive index layer 36 facing the on-chip lens 27a of the first pixel unit 9a (region excluding the region facing the on-chip lens 27b) has a flat shape parallel to the back surface S1 of the substrate 2.

By making the on-chip lens 27b of the second pixel unit 9b on the low-refractive index layer 36 side have a projecting lens surface to form a biconvex lens, it is possible to cause, in the second pixel unit 9b, incident light 38 that has entered the on-chip lens 27b to be refracted toward the center of the pixel unit at the interface between the on-chip lens layer 19 and the low-refractive index layer 36. Therefore, for example, it is possible to improve the light collection accuracy of the second pixel unit 9b as compared with the case where the on-chip lens 27b is a convex-flat lens.

Further, with the second inter-CF light-shielding portion 28b higher than the first inter-CF light-shielding portion 28a (H2>H1), it is possible to cause, in the first pixel unit 9a adjacent to the second pixel unit 9b, the incident light 31 that has been transmitted through the boundary region between the edge of the on-chip lens 27b of the second pixel unit 9b and the edge of the on-chip lens 27 of the first pixel unit 9a to be reflected on the light incident surface of the second inter-CF light-shielding portion 28b and suppress optical color mixing.

4. Fourth Embodiment: Solid-State Imaging Device

Figure 17A:
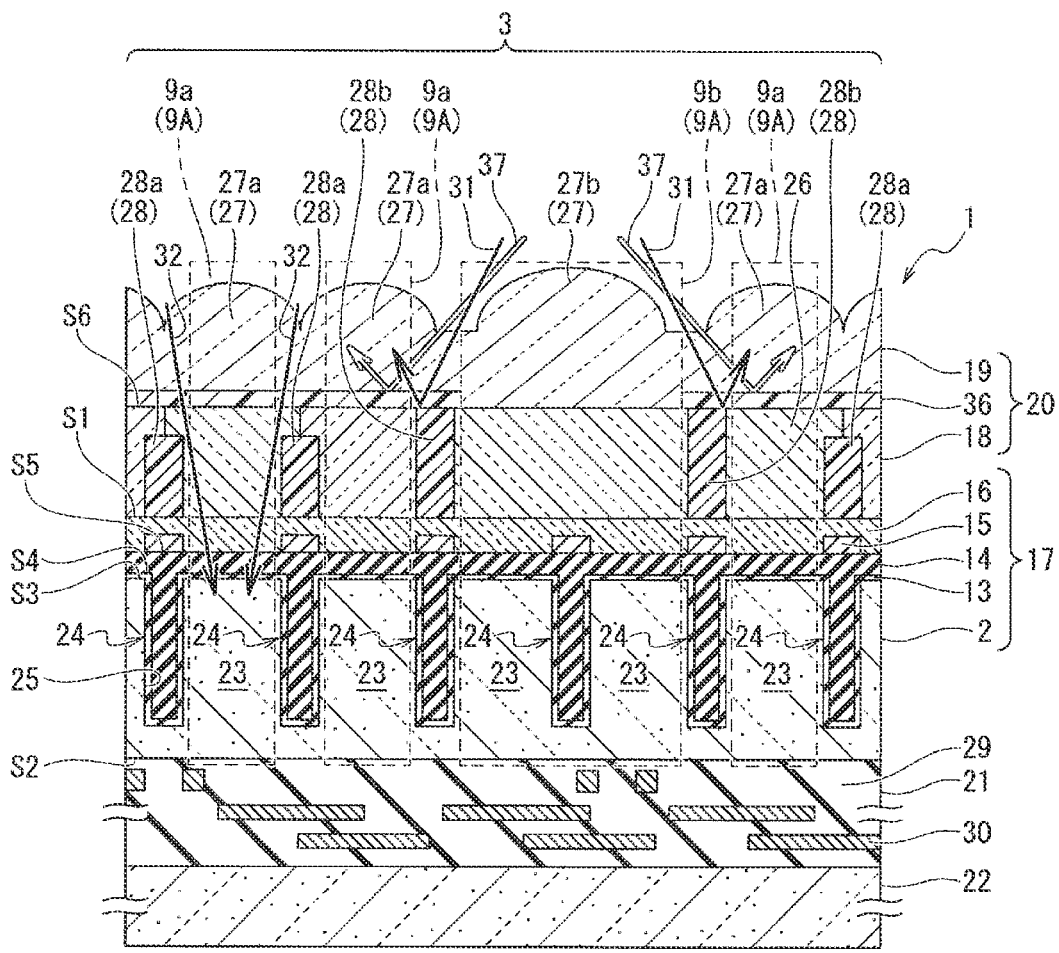
FIG. 17A is a diagram showing a cross-sectional configuration of a pixel region of a solid-state imaging device according to a fourth embodiment.
Figure 17B:
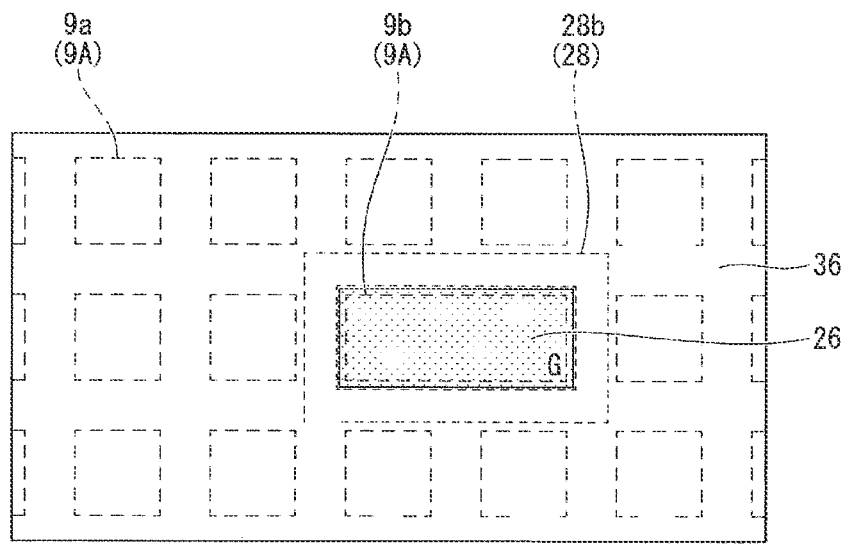
FIG. 17B is a planar configuration diagram of the pixel region of FIG. 17A, omitting an on-chip lens layer.

Next, the solid-state imaging device 1 according to the fourth embodiment will be described. The solid-state imaging device 1 according to the fourth embodiment is obtained by changing part of the configuration of the solid-state imaging device 1 according to the second embodiment. Since the configuration of the entire solid-state imaging device 1 according to the fourth embodiment is similar to that in FIG. 1, illustration thereof is omitted. FIG. 17A is a cross-sectional configuration diagram of main parts of the solid-state imaging device 1 according to the fourth embodiment. In FIG. 17A, portions corresponding to those in FIG. 2A and FIG. 15 will be denoted by the same reference symbols and overlapping description is omitted. FIG. 17B is a planar configuration diagram of the pixel region 3, omitting the on-chip lens layer 19.

The solid-state imaging device 1 according to the fourth embodiment is different from that according to the second embodiment in the shape of the low-refractive index layer 36. In the fourth embodiment, as shown in FIG. 17A and FIG. 17B, the low-refractive index layer 36 is formed so as to cover the back surface S6 (light incident surface) of the color filter layer 18 excluding the back surface S6 (light incident surface) of the color filter 26 of the second pixel unit 9b. That is, the low-refractive index layer 36 is formed so as not to cover the back surface S6 (light incident surface) of the color filter 26 of the second pixel unit 9b but to cover only the back surface S6 (light incident surface) of the color filters 26 of the plurality of first pixel units 9a arranged in a matrix in a continuous manner.

By covering the back surface S6 (light incident surface) of the color filters 26 of the first pixel units 9a with the low-refractive index layer 36 in a continuous manner, it is possible to cause, in the first pixel unit 9a adjacent to the second pixel unit 9b, the incident light 37 that travels to the light incident surface of the photoelectric conversion unit 23 of the first pixel unit 9a, of incident light that is transmitted through the boundary region between the edge of the on-chip lens 27b of the second pixel unit 9b and the edge of the on-chip lens 27a of the first pixel unit 9a, to be reflected on the interface between the on-chip lens layer 19 and the low-refractive index layer 36 and more appropriately suppress optical color mixing.

Further, with the configuration in which the low-refractive index layer 36 does not cover the back surface S6 (light incident surface) of the color filter 26 of the second pixel unit 9b, it is possible to prevent, in the second pixel unit 9b, the incident light that is collected by the on-chip lens 27b and travels to the light incident surface of the photoelectric conversion unit 23 from being reflected on the interface between the on-chip lens layer 19 and the low-refractive index layer 36, suppress the reduction in the amount of incident light onto the photoelectric conversion unit 23 of the second pixel unit 9b, and improve the light collection accuracy.

5. Fifth Embodiment: Solid-State Imaging Device

Figure 18A:
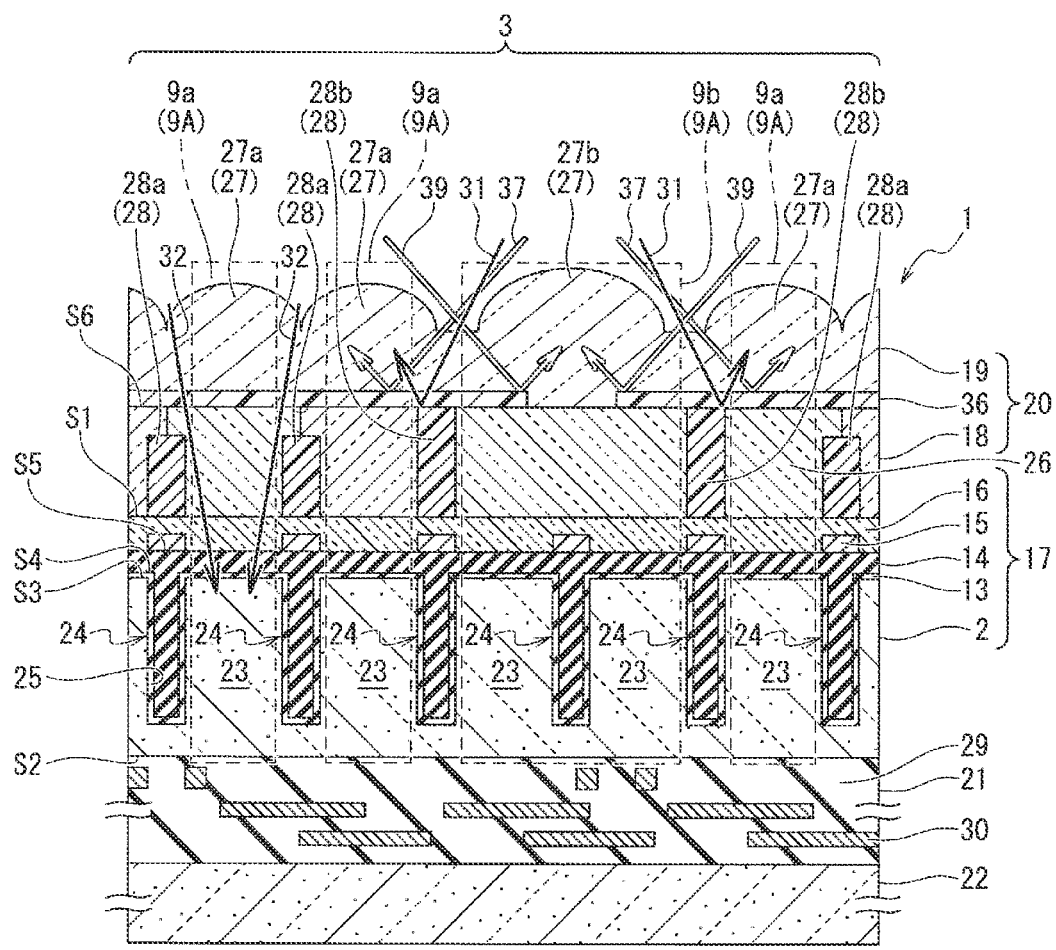
FIG. 18A is a diagram showing a cross-sectional configuration of the pixel region of a solid-state imaging device according to a fifth embodiment.
Figure 18B:
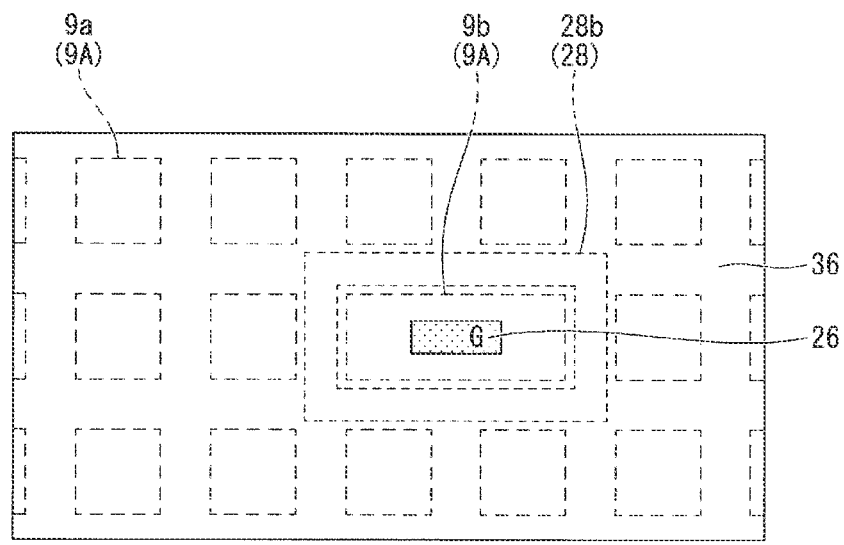
FIG. 18B is a planar configuration diagram of the pixel region of FIG. 18A, omitting an on-chip lens layer.

Next, the solid-state imaging device 1 according to a fifth embodiment will be described. The solid-state imaging device 1 according to the fifth embodiment is obtained by changing part of the configuration of the solid-state imaging device 1 according to the fourth embodiment. Since the configuration of the entire solid-state imaging device 1 according to the fifth embodiment is similar to that in FIG. 1, illustration thereof is omitted. FIG. 18A is a cross-sectional configuration diagram of main parts of the solid-state imaging device 1 according to the fifth embodiment. In FIG. 18A, portions corresponding to those in FIG. 2A and FIG. 17A will be denoted by the same reference symbols and overlapping description is omitted. FIG. 18B is a planar configuration diagram of the pixel region 3, omitting the on-chip lens layer 19.

The solid-state imaging device 1 according to the fifth embodiment is different from that according to the fourth embodiment in the shape of the low-refractive index layer 36. In the fifth embodiment, as shown in FIG. 18A and FIG. 18B, the low-refractive index layer 36 is formed so as to cover the back surface S6 (light incident surface) of the color filter layer 18 excluding a central portion of a region facing the on-chip lens 27b of the second pixel unit 9b. That is, the low-refractive index layer 36 is formed so as not to cover a central portion of a region facing the on-chip lens 27b of the second pixel unit 9b but to cover only the back surface S6 (light incident surface) of the color filter 26 of the first pixel unit 9a and the outer periphery side (i.e., the first pixel unit 9a side) of the back surface S6 (light incident surface) of the color filter 26 of the second pixel unit 9b in a continuous manner.

By covering the back surface S6 (light incident surface) of the color filter 26 of the first pixel unit 9a with the low-refractive index layer 36 in a continuous manner, it is possible to cause, in the first pixel unit 9a adjacent to the second pixel unit 9b, the incident light 37 that travels to the light incident surface of the photoelectric conversion unit 23 of the first pixel unit 9a, of incident light that is transmitted through the boundary region between the edge of the on-chip lens 27b of the second pixel unit 9b and the edge of the on-chip lens 27a of the first pixel unit 9a, to be reflected on the interface between the on-chip lens layer 19 and the low-refractive index layer 36 and more appropriately suppress optical color mixing.

Further, with the configuration in which the low-refractive index layer 36 covers also the outer periphery side of the back surface S6 (light incident surface) of the color filter 26 of the second pixel unit 9b, it is possible to cause, in the second pixel unit 9b, incident light 39 that travels to the light incident surface of the photoelectric conversion unit 23 of the second pixel unit 9b, of incident light that is transmitted through the boundary region between the edge of the on-chip lens 27b of the second pixel unit 9b and the edge of the on-chip lens 27a of the first pixel unit 9a, to be reflected on the interface between the on-chip lens layer 19 and the low-refractive index layer 36 and improve the light collection accuracy of the second pixel unit 9b.

6. Sixth Embodiment: Solid-State Imaging Device

Figure 19A:
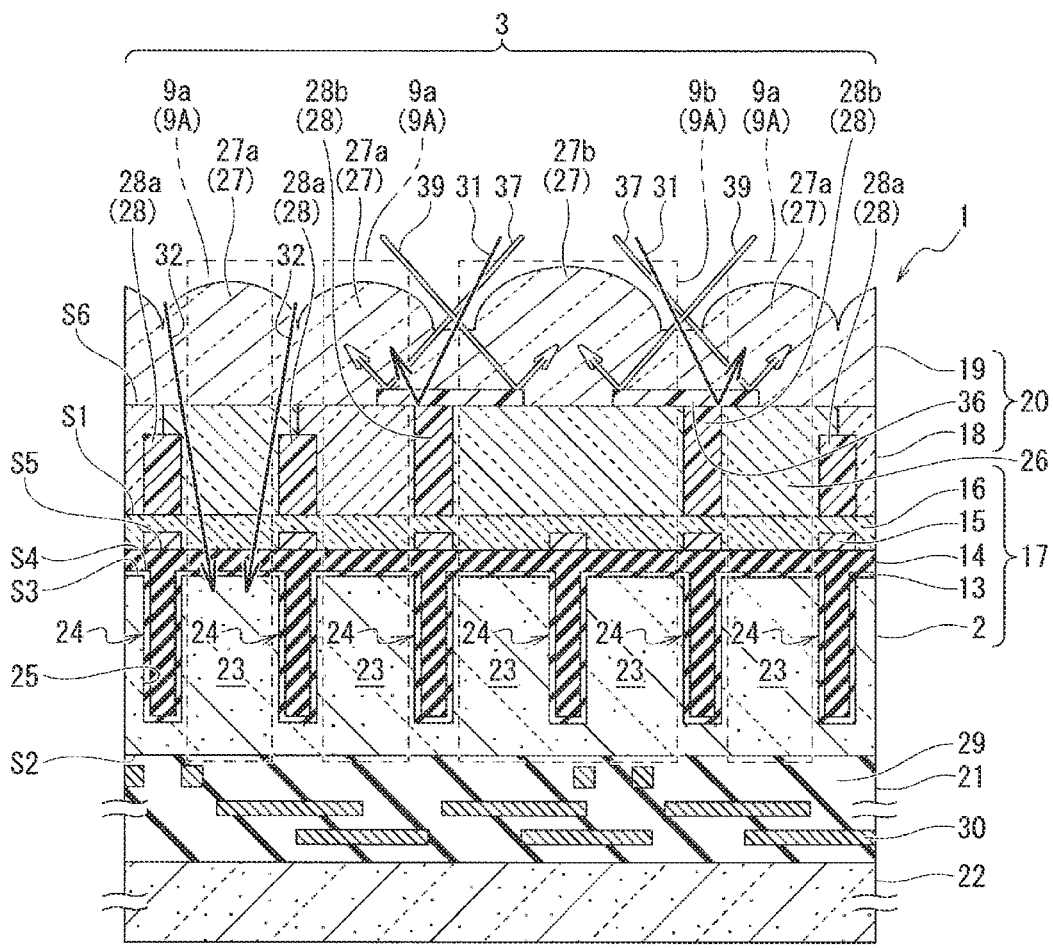
FIG. 19A is a diagram showing a cross-sectional configuration of a pixel region of a solid-state imaging device according to a sixth embodiment.
Figure 19B:
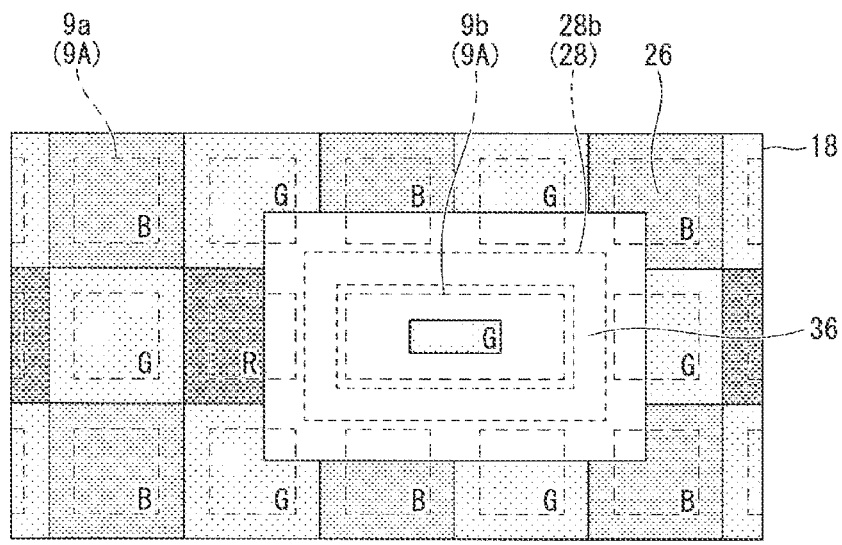
FIG. 19B is a planar configuration diagram of the pixel region of FIG. 19A, omitting an on-chip lens layer.

Next, the solid-state imaging device 1 according to a sixth embodiment will be described. The solid-state imaging device 1 according to the sixth embodiment is obtained by changing part of the configuration of the solid-state imaging device 1 according to the second embodiment. Since the configuration of the entire solid-state imaging device 1 according to the sixth embodiment is similar to that in FIG. 1, illustration thereof is omitted. FIG. 19A is a cross-sectional configuration diagram of main parts of the solid-state imaging device 1 according to the sixth embodiment. In FIG. 19A, portions corresponding to those in FIG. 2A and FIG. 18A will be denoted by the same reference symbols and overlapping description is omitted. FIG. 19B is a planar configuration diagram of the pixel region 3, omitting the on-chip lens layer 19.

The solid-state imaging device 1 according to the sixth embodiment is different from that according to the second embodiment in the shape of the low-refractive index layer 36. In the sixth embodiment, as shown in FIG. 19A and FIG. 19B, the low-refractive index layer 36 is formed so as to cover the outer periphery side of the back surface S6 (light incident surface) of the color filter 26 of the second pixel unit 9b and the second pixel unit 9b side of the back surface S6 (light incident surface) of the color filter 26 of the first pixel unit 9a adjacent to the second pixel unit 9b. In other words, it can be said that the low-refractive index layer 36 is formed so as to cover only a portion on the outer periphery side of the back surface S6 (light incident surface) of the color filter 26 of the second pixel unit 9b. That is, the low-refractive index layer 36 is formed so as not to cover the back surface S6 (light incident surface) of the color filter 26 of the first pixel unit 9a that is not adjacent to the second pixel unit 9b but to cover only the second pixel unit 9b side of the back surface S6 (light incident surface) of the color filter 26 of the first pixel unit 9a adjacent to the second pixel unit 9b and the outer periphery side of the back surface S6 (light incident surface) of the color filter 26 of the second pixel unit 9b in a continuous manner.

By covering the second pixel unit 9b side of the back surface S6 (light incident surface) of the color filter 26 of the first pixel unit 9a adjacent to the second pixel unit 9b with the low-refractive index layer 36, it is possible to cause, in the first pixel unit 9a adjacent to the second pixel unit 9b, the incident light 37 that travels to the light incident surface of the photoelectric conversion unit 23 of the first pixel unit 9a, of incident light that is transmitted through the boundary region between the edge of the on-chip lens 27b of the second pixel unit 9b and the edge of the on-chip lens 27a of the first pixel unit 9a, to be reflected on the interface between the on-chip lens layer 19 (on-chip lens 27a) and the low-refractive index layer 36 and more appropriately suppress optical color mixing.

Further, with the configuration in which the low-refractive index layer 36 covers also the outer periphery side of the back surface S6 (light incident surface) of the color filter 26 of the second pixel unit 9b, it is possible to cause, in the second pixel unit 9b, the incident light 39 that travels to the light incident surface of the photoelectric conversion unit 23 of the second pixel unit 9b, of incident light that is transmitted through the boundary region between the edge of the on-chip lens 27b of the second pixel unit 9b and the edge of the on-chip lens 27a of the first pixel unit 9a, to be reflected on the interface between the on-chip lens layer 19 and the low-refractive index layer 36 and improve the light collection accuracy of the second pixel unit 9b.

Further, with the configuration in which the low-refractive index layer 36 does not cover the central portion of the pixel unit on the back surface S6 (a light incident surface) of the second pixel unit 9b, it is possible to prevent, in the second pixel unit 9b, the incident light that is collected by the on-chip lens 27b and travels to the light incident surface of the photoelectric conversion unit 23 from being reflected on the interface between the on-chip lens layer 19 and the low-refractive index layer 36, suppress the reduction in the amount of incident light onto the photoelectric conversion unit 23 of the second pixel unit 9b, and further improve the light collection accuracy.

Further, with the configuration in which the low-refractive index layer 36 does not cover the back surface S6 (light incident surface) of the first pixel unit 9a that is not adjacent to the second pixel unit 9b, it is possible to prevent, in the first pixel unit 9a, the incident light 32 that is collected by the on-chip lens 27a and travels to the photoelectric conversion unit 23 from being reflected on the interface between the on-chip lens layer 19 and the low-refractive index layer 36, suppress the reduction in the amount of incident light onto the photoelectric conversion unit 23 of the first pixel unit 9a, and further improve the sensitivity.

7. Seventh Embodiment: Solid-State Imaging Device

Figure 20:
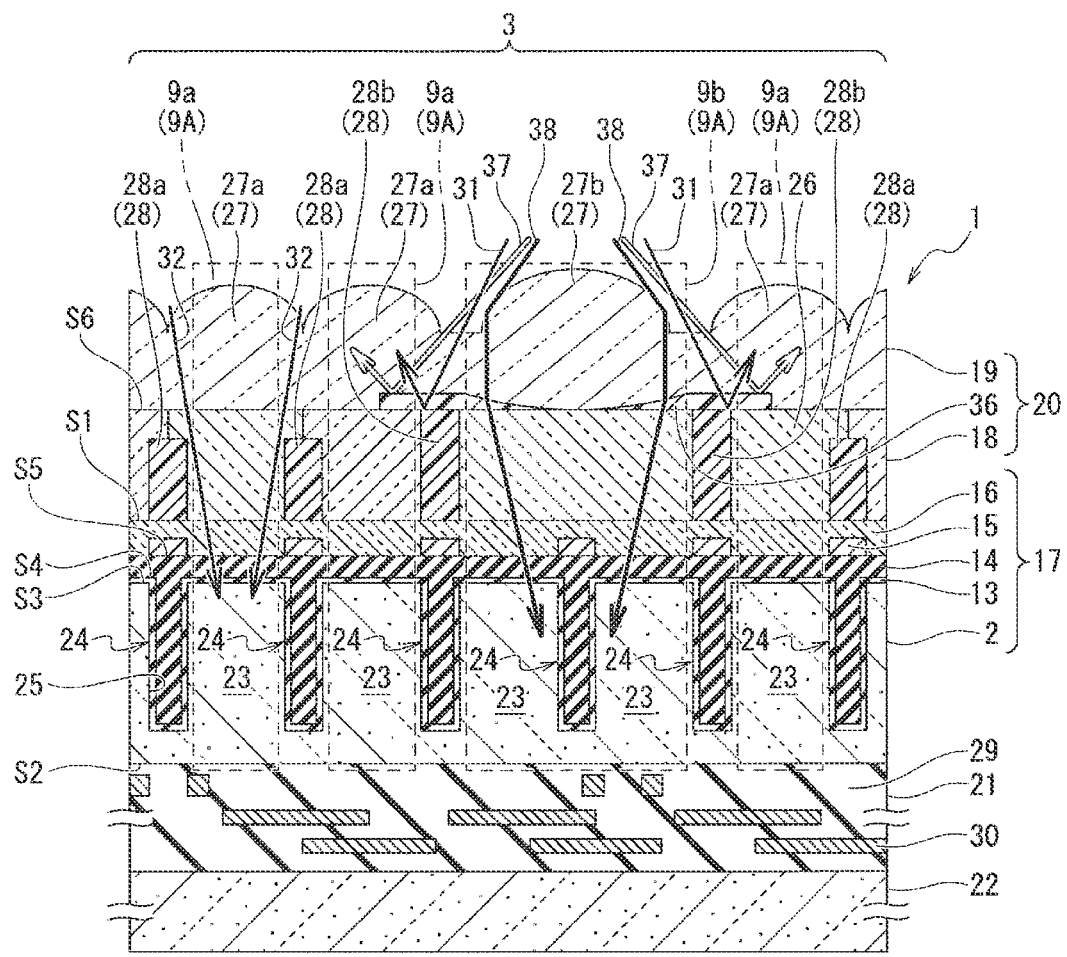
FIG. 20 is a diagram showing a cross-sectional configuration of a pixel region of a solid-state imaging device according to a seventh embodiment.

Next, the solid-state imaging device 1 according to a seventh embodiment will be described. The solid-state imaging device 1 according to the seventh embodiment is obtained by changing part of the configuration of the solid-state imaging device 1 according to the third embodiment. Since the configuration of the entire solid-state imaging device 1 according to the seventh embodiment is similar to that in FIG. 1, illustration thereof is omitted. FIG. 20 is a cross-sectional configuration diagram of main parts of the solid-state imaging device 1 according to the seventh embodiment. In FIG. 20, portions corresponding to those in FIG. 2A and FIG. 16 will be denoted by the same reference symbols and overlapping description is omitted.

The solid-state imaging device 1 according to the seventh embodiment is different from that according to the third embodiment in the shape of the low-refractive index layer 36. In the seventh embodiment, as shown in FIG. 20, the low-refractive index layer 36 is formed so as to cover the back surface S6 (light incident surface) of the color filter 26 of the second pixel unit 9b and the second pixel unit 9b side of the back surface S6 (light incident surface) of the color filter 26 of the first pixel unit 9a adjacent to the second pixel unit 9b. That is, the low-refractive index layer 36 is formed so as not to cover the back surface S6 (light incident surface) of the color filter 26 of the first pixel unit 9a that is not adjacent to the second pixel unit 9b but to cover only the back surface S6 (light incident surface) of the color filter 26 of the second pixel unit 9b and the second pixel unit 9b side of the back surface S6 (light incident surface) of the color filter 26 of the first pixel unit 9a adjacent to the second pixel unit 9b in a continuous manner. Further, the low-refractive index layer 36 has a parabolic shape in which a central portion of a region facing the on-chip lens 27b of the second pixel unit 9b is recessed toward a side of the color filter 26 such that the on-chip lens 27b has a projecting lens surface on a side of the low-refractive index layer 36.

By covering the second pixel unit 9b side of the back surface S6 (light incident surface) of the color filter 26 of the first pixel unit 9a adjacent to the second pixel unit 9b with the low-refractive index layer 36, it is possible to cause, in the first pixel unit 9a adjacent to the second pixel unit 9b, the incident light 37 that travels to the light incident surface of the photoelectric conversion unit 23 of the first pixel unit 9a, of incident light that is transmitted through the boundary region between the edge of the on-chip lens 27b of the second pixel unit 9b and the edge of the on-chip lens 27a of the first pixel unit 9a, to be reflected on the interface between the on-chip lens layer 19 (on-chip lens 27a) and the low-refractive index layer 36 and more appropriately suppress optical color mixing.

Further, by making the on-chip lens 27b of the second pixel unit 9b on the low-refractive index layer 36 side have a projecting lens surface to form a biconvex lens, it is possible to cause, in the second pixel unit 9b, the incident light 38 that has entered the on-chip lens 27b to be refracted toward the center of the pixel unit at the interface between the on-chip lens layer 19 and the low-refractive index layer 36. Therefore, for example, it is possible to improve the light collection accuracy of the second pixel unit 9b as compared with the case where the on-chip lens 27b is a convex-flat lens.

Further, with the configuration in which the low-refractive index layer 36 does not cover the back surface S6 (light incident surface) of the first pixel unit 9a that is not adjacent to the second pixel unit 9b, it is possible to prevent, in the first pixel unit 9a, the incident light 32 that is collected by the on-chip lens 27a and travels to the photoelectric conversion unit 23 from being reflected on the interface between the on-chip lens layer 19 and the low-refractive index layer 36, suppress the reduction in the amount of incident light onto the photoelectric conversion unit 23 of the first pixel unit 9a, and further improve the sensitivity.

8. Eighth Embodiment: Solid-State Imaging Device

Figure 21A:
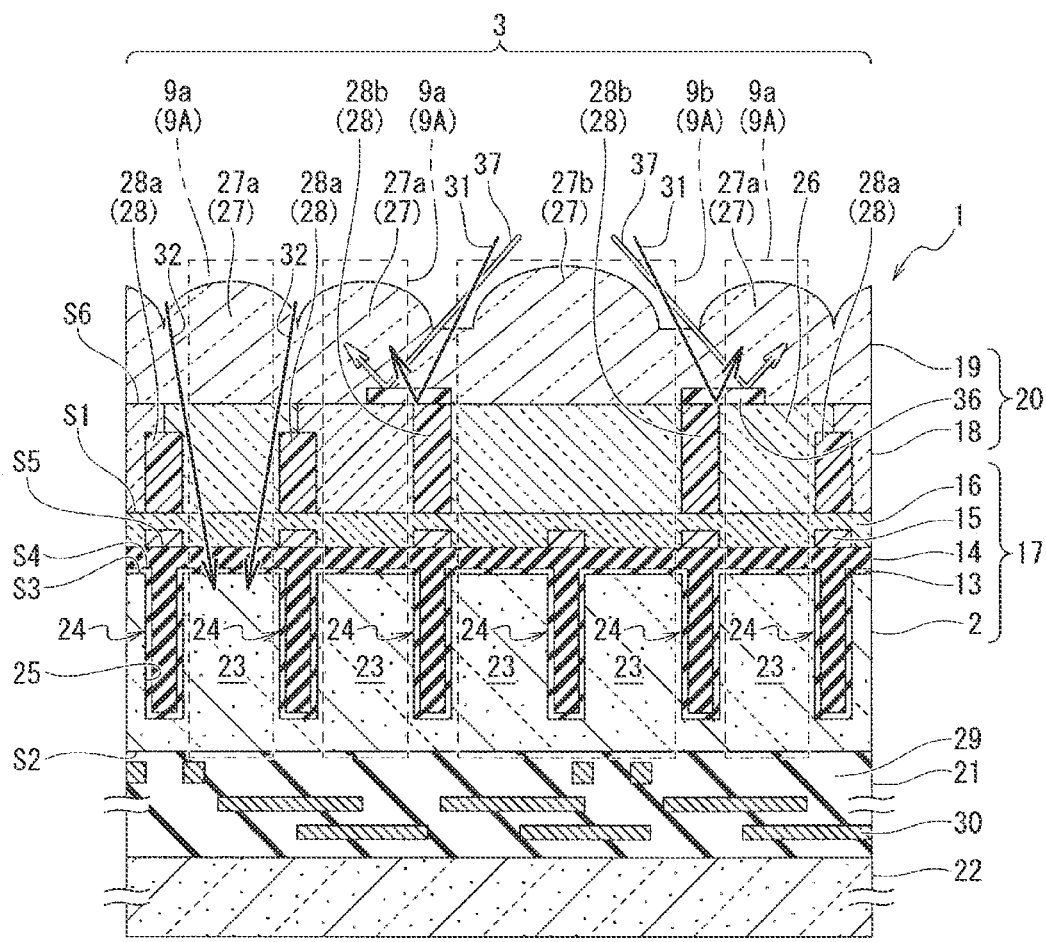
FIG. 21A is a diagram showing a cross-sectional configuration of a pixel region of a solid-state imaging device according to an eighth embodiment.
Figure 21B:
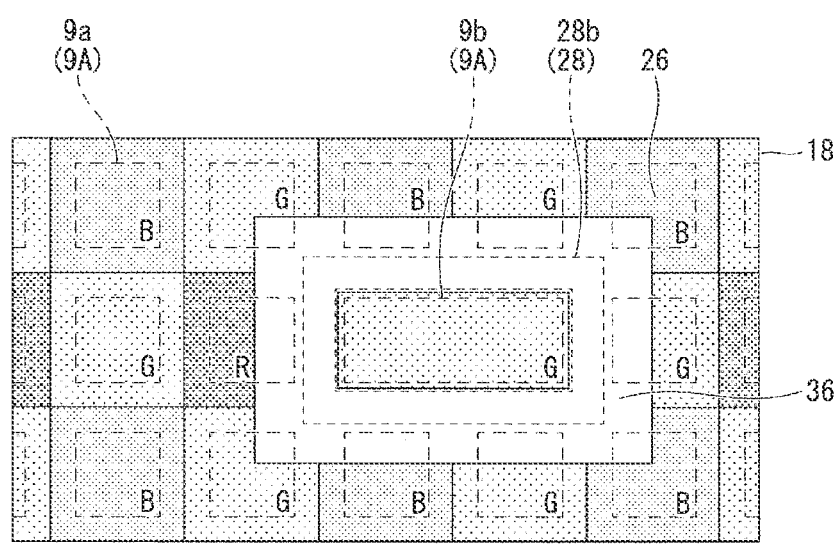
FIG. 21B is a planar configuration diagram of the pixel region of FIG. 21A, omitting an on-chip lens layer.

Next, the solid-state imaging device 1 according to an eighth embodiment will be described. The solid-state imaging device 1 according to the eighth embodiment is obtained by changing part of the configuration of the solid-state imaging device 1 according to the second embodiment. Since the configuration of the entire solid-state imaging device 1 according to the eighth embodiment is similar to that in FIG. 1, illustration thereof is omitted. FIG. 21A is a cross-sectional configuration diagram of main parts of the solid-state imaging device 1 according to the eighth embodiment. In FIG. 21A, portions corresponding to those in FIG. 2A and FIG. 15 will be denoted by the same reference symbols and overlapping description is omitted. FIG. 21B is a planar configuration diagram of the pixel region 3, omitting the on-chip lens layer 19.

The solid-state imaging device 1 according to the eighth embodiment is different from that according to the second embodiment in the shape of the low-refractive index layer 36. In the eighth embodiment, as shown in FIG. 21A and FIG. 21B, the low-refractive index layer 36 is formed so as to cover only a portion on the second pixel unit 9b side of the back surface S6 (light incident surface) of the color filter 26 of the first pixel unit 9a adjacent to the second pixel unit 9b. That is, the low-refractive index layer 36 is formed so as not to cover the back surface S6 (light incident surface) of the color filter 26 of the second pixel unit 9b and the back surface S6 (light incident surface) of the color filter 26 of the first pixel unit 9a that is not adjacent to the second pixel unit 9b but to cover only the second pixel unit 9b side of the back surface S6 of the color filter 26 of the first pixel unit 9a adjacent to the second pixel unit 9b and the back surface S6 of the second inter-CF light-shielding portion 28b in a continuous manner.

By covering the second pixel unit 9b side of the back surface S6 (light incident surface) of the color filter 26 of the first pixel unit 9a adjacent to the second pixel unit 9b with the low-refractive index layer 36, it is possible to cause, in the first pixel unit 9a adjacent to the second pixel unit 9b, the incident light 37 that travels to the light incident surface of the photoelectric conversion unit 23 of the first pixel unit 9a, of incident light that is transmitted through the boundary region between the edge of the on-chip lens 27b of the second pixel unit 9b and the edge of the on-chip lens 27a of the first pixel unit 9a, to be reflected on the interface between the on-chip lens layer 19 (on-chip lens 27a) and the low-refractive index layer 36 and more appropriately suppress optical color mixing.

Further, with the configuration in which the low-refractive index layer 36 does not cover the back surface S6 (light incident surface) of the second pixel unit 9b, it is possible to prevent, in the second pixel unit 9b, the incident light that is collected by the on-chip lens 27b and travels to the light incident surface of the photoelectric conversion unit 23 from being reflected on the interface between the on-chip lens layer 19 and the low-refractive index layer 36, suppress the reduction in the amount of incident light onto the photoelectric conversion unit 23 of the second pixel unit 9b, and improve the light collection accuracy of the second pixel unit 9b.

Further, with the configuration in which the low-refractive index layer 36 does not cover the back surface S6 (light incident surface) of the first pixel unit 9a that is not adjacent to the second pixel unit 9b, it is possible to prevent, in the first pixel unit 9a, the incident light 32 that is collected by the on-chip lens 27a and travels to the photoelectric conversion unit 23 from being reflected on the interface between the on-chip lens layer 19 and the low-refractive index layer 36, suppress the reduction in the amount of incident light onto the photoelectric conversion unit 23 of the first pixel unit 9a, and further improve the sensitivity.

9. Ninth Embodiment: Solid-State Imaging Device

Figure 22A:
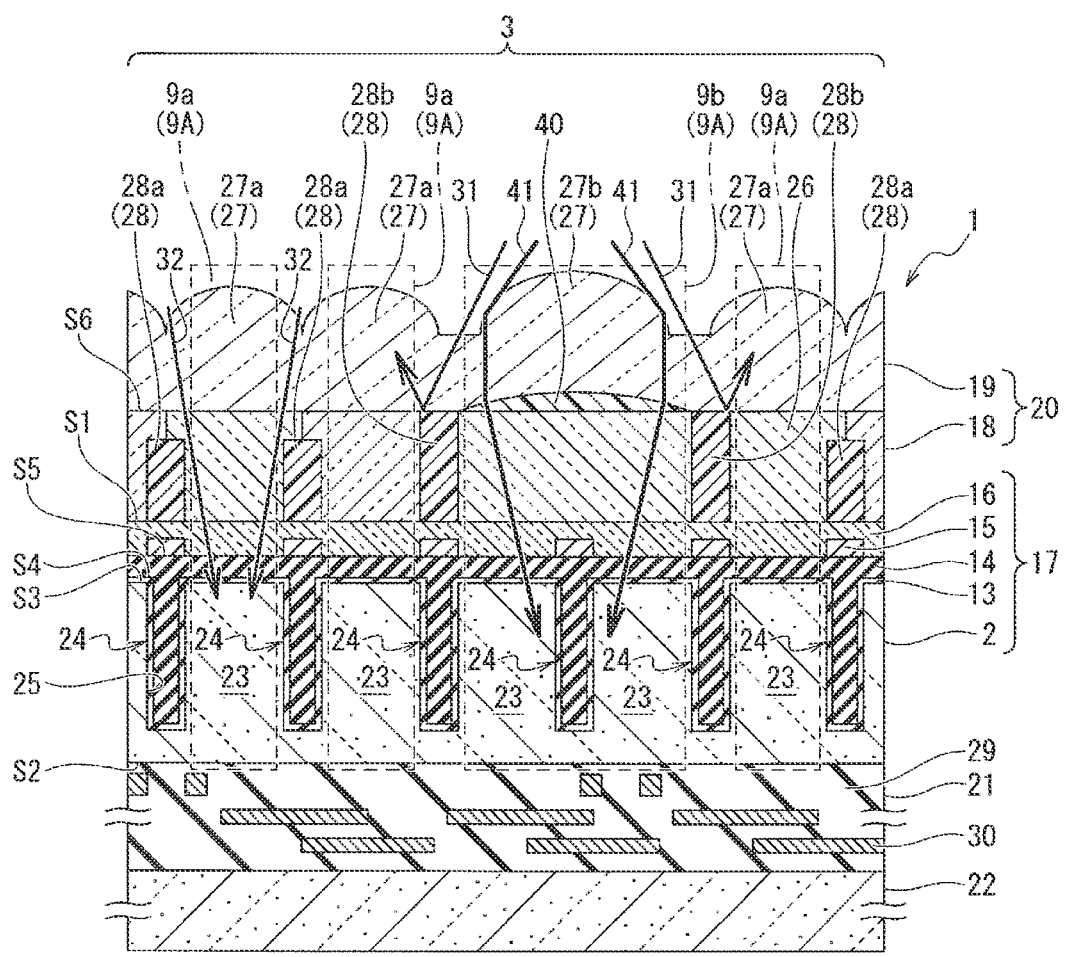
FIG. 22A is a diagram showing a cross-sectional configuration of a pixel region of a solid-state imaging device according to a ninth embodiment.
Figure 22B:
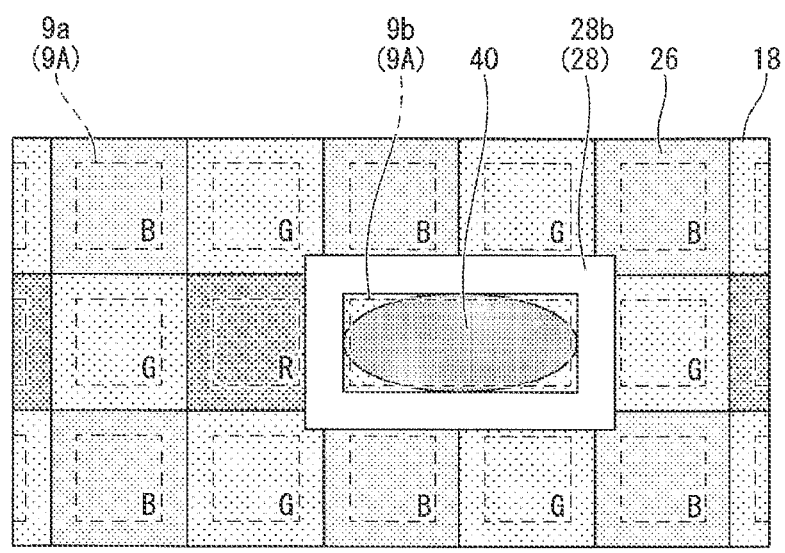
FIG. 22B is a planar configuration diagram of the pixel region of FIG. 22A, omitting an on-chip lens layer.

Next, the solid-state imaging device 1 according to a ninth embodiment will be described. The solid-state imaging device 1 according to the ninth embodiment is obtained by changing part of the configuration of the solid-state imaging device 1 according to the first embodiment. Since the configuration of the entire solid-state imaging device 1 according to the ninth embodiment is similar to that in FIG. 1, illustration thereof is omitted. FIG. 22A is a cross-sectional configuration diagram of main parts of the solid-state imaging device 1 according to the ninth embodiment. In FIG. 22A, portions corresponding to those in FIG. 2A will be denoted by the same reference symbols and overlapping description is omitted. FIG. 22B is a planar configuration diagram of the pixel region 3, omitting the on-chip lens layer 19.

The solid-state imaging device 1 according to the ninth embodiment is different from that according to the first embodiment in the layer configuration of the light collection layer 20. In the ninth embodiment, as shown in FIG. 22A and FIG. 22B, the light collection layer 20 includes a high-refractive index layer 40 between the color filter 26 and the on-chip lens 27b of the second pixel unit 9b. The high-refractive index layer is formed so as to cover the back surface S6 (light incident surface) of the color filter 26 of the second pixel unit 9b. As the material of the high-refractive index layer 40, for example, a material having a refractive index higher than that of the on-chip lens 27 can be employed. Examples of the material having a high refractive index include a high refractive index resin. The high-refractive index layer 40 has a projecting lens surface on the side of the on-chip lens 27b of the second pixel unit 9b, and has a flat surface parallel to the back surface S1 (light incident surface) of the substrate 2, on the color filter 26 side. As a result, the high-refractive index layer 40 forms a convex-flat lens. As the lens surface, for example, a spherical surface or an aspherical surface can be employed. FIG. 22A and FIG. 22B illustrate a case where the lens surface of the high-refractive index layer 40 is a curved surface having a radius of curvature larger than that of the lens surface on the side of the light incident surface of the on-chip lens 27b. Further, the high-refractive index layer 40 forms a recessed lens surface recessed toward the light incident surface on the side of the high-refractive index layer 40 of the on-chip lens 27b of the second pixel unit 9b. As a result, the on-chip lens 27b of the second pixel unit 9b forms a convex meniscus lens.

The high-refractive index layer 40 having a projecting lens surface on the side of the on-chip lens 27b of the second pixel unit 9b formed between the on-chip lens 27b and the color filter 26 of the second pixel unit 9b makes it possible to cause, in the second pixel unit 9b, incident light 41 that has entered the on-chip lens 27b to be refracted toward the center of the pixel unit at the interface between the on-chip lens 27b and the high-refractive index layer 40. Therefore, it is possible to improve the light collection accuracy of the second pixel unit 9b.

Further, with the second inter-CF light-shielding portion 28b higher than the first inter-CF light-shielding portion 28a (H2>H1), it is possible to cause, in the first pixel unit 9a adjacent to the second pixel unit 9b, the incident light 31 that has been transmitted through the boundary region between the edge of the on-chip lens 27b of the second pixel unit 9b and the edge of the on-chip lens 27 of the first pixel unit 9a to be reflected on the light incident surface of the second inter-CF light-shielding portion 28b and suppress optical color mixing.

10. Tenth Embodiment: Solid-State Imaging Device

Figure 23A:
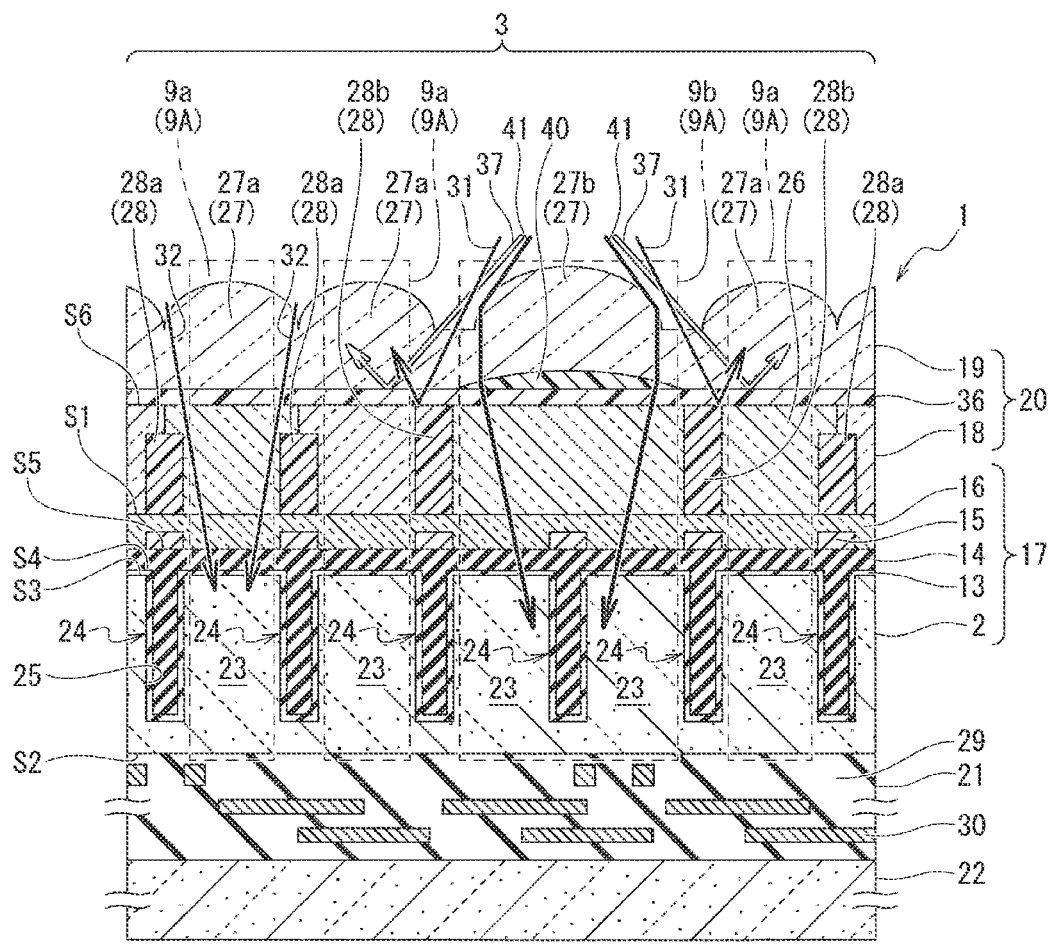
FIG. 23A is a diagram showing a cross-sectional configuration of a pixel region of a solid-state imaging device according to a tenth embodiment.
Figure 23B:
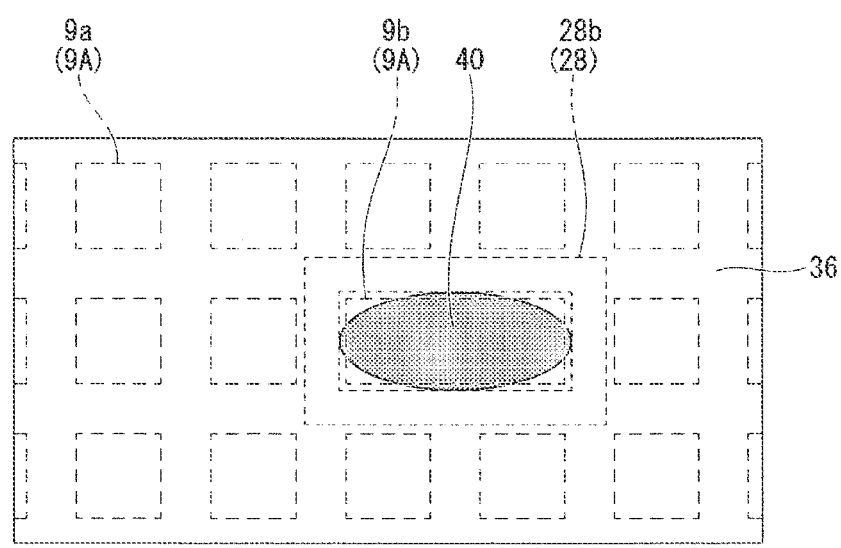
FIG. 23B is a planar configuration diagram of the pixel region of FIG. 23A, omitting an on-chip lens layer.

Next, the solid-state imaging device 1 according to a tenth embodiment will be described. The solid-state imaging device 1 according to the tenth embodiment is obtained by combining the configuration of the solid-state imaging device 1 according to the second embodiment and the solid-state imaging device 1 according to the ninth embodiment with each other. Since the configuration of the entire solid-state imaging device 1 according to the tenth embodiment is similar to that in FIG. 1, illustration thereof is omitted. FIG. 23A is a cross-sectional configuration diagram of main parts of the solid-state imaging device 1 according to the tenth embodiment. In FIG. 23A, portions corresponding to those in FIG. 2A, FIG. 15, and FIG. 22A will be denoted by the same reference symbols and overlapping description is omitted. FIG. 23B is a planar configuration diagram of the pixel region 3, omitting the on-chip lens layer 19.

The solid-state imaging device 1 according to the tenth embodiment is different from those in the second and ninth embodiments in that the layer configuration of the light collection layer 20. In the tenth embodiment, as shown in FIG. 23A and FIG. 23B, the light collection layer 20 includes the low-refractive index layer 36 and the high-refractive index layer 40 between the color filter 26 and the on-chip lens 27b of the second pixel unit 9b. The low-refractive index layer 36 is formed so as to cover the entire region of the back surface S6 (light incident surface) of the color filter layer 18. Further, the high-refractive index layer 40 is formed so as to cover the back surface S6 (light incident surface) of the color filter 26 of the second pixel unit 9b with the low-refractive index layer 36 sandwiched therebetween. The high-refractive index layer 40 has a projecting lens surface (a spherical surface, an aspherical surface, or the like) on the side of the on-chip lens 27b of the second pixel unit 9b and has, on the color filter 26 side, a flat surface parallel to the back surface S1 (light incident surface) of the substrate 2. As a result, the high-refractive index layer 40 forms a convex-flat lens. Further, the high-refractive index layer 40 forms a recessed lens surface recessed toward the light incident surface on the side of the high-refractive index layer 40 of the on-chip lens 27b of the second pixel unit 9b. As a result, the on-chip lens 27b of the second pixel unit 9b forms a convex meniscus lens.

By covering the entire region of the back surface S6 (light incident surface) of the color filter layer 18 with the low-refractive index layer 36, it is possible to cause, in the first pixel unit 9a adjacent to the second pixel unit 9b, the incident light 37 that travels to the light incident surface of the photoelectric conversion unit 23 of the first pixel unit 9a, of incident light that is transmitted through the boundary region between the edge of the on-chip lens 27b of the second pixel unit 9b and the edge of the on-chip lens 27a of the first pixel unit 9a, to be reflected on the interface between the on-chip lens layer 19 (on-chip lens 27a) and the low-refractive index layer 36 and more appropriately suppress optical color mixing.

The high-refractive index layer 40 having a projecting lens surface formed between the on-chip lens 27b and the color filter 26 of the second pixel unit 9b makes it possible to cause, in the second pixel unit 9b, the incident light 41 that has entered the on-chip lens 27b to be refracted toward the center of the pixel unit at the interface between the on-chip lens 27b and the high-refractive index layer 40. Therefore, it is possible to further improve the light collection accuracy of the second pixel unit 9b.

11. Eleventh Embodiment: Solid-State Imaging Device

Figure 24A:
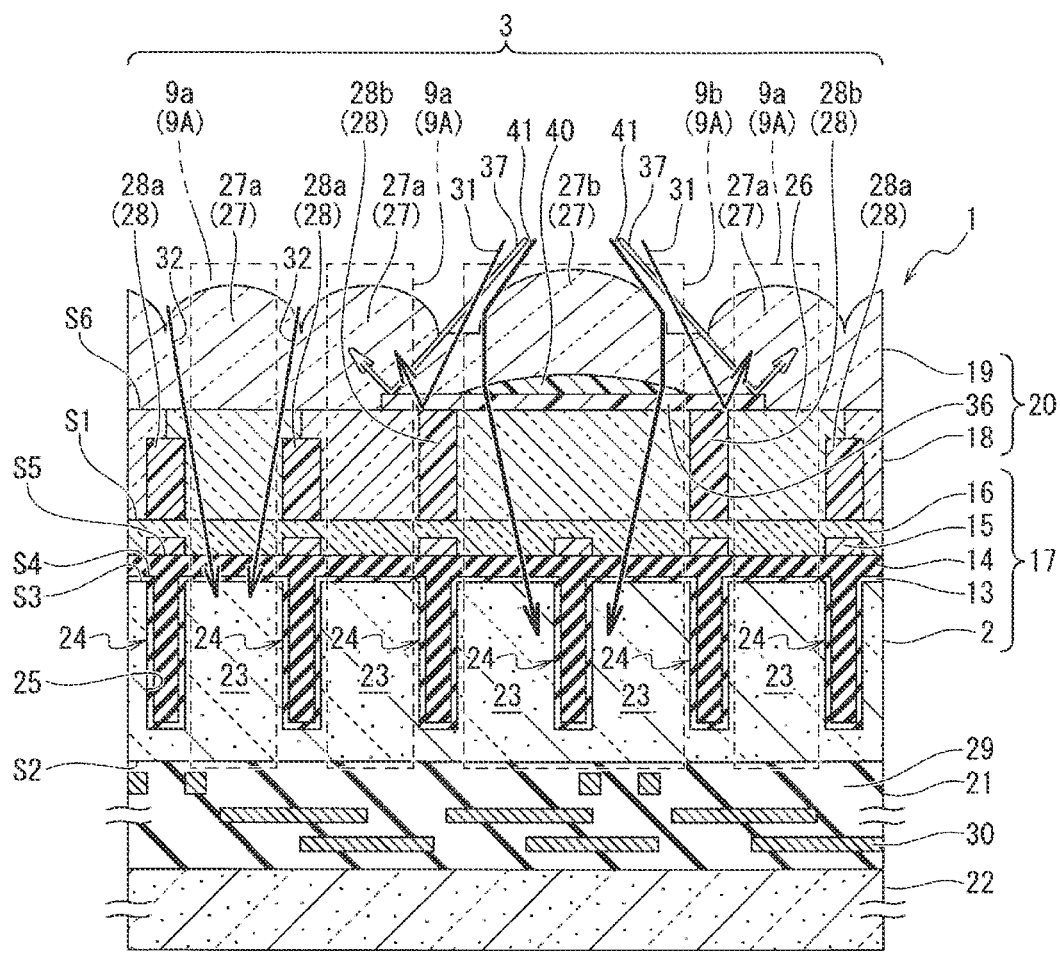
FIG. 24A is a diagram showing a cross-sectional configuration of a pixel region of a solid-state imaging device according to an eleventh embodiment.
Figure 24B:
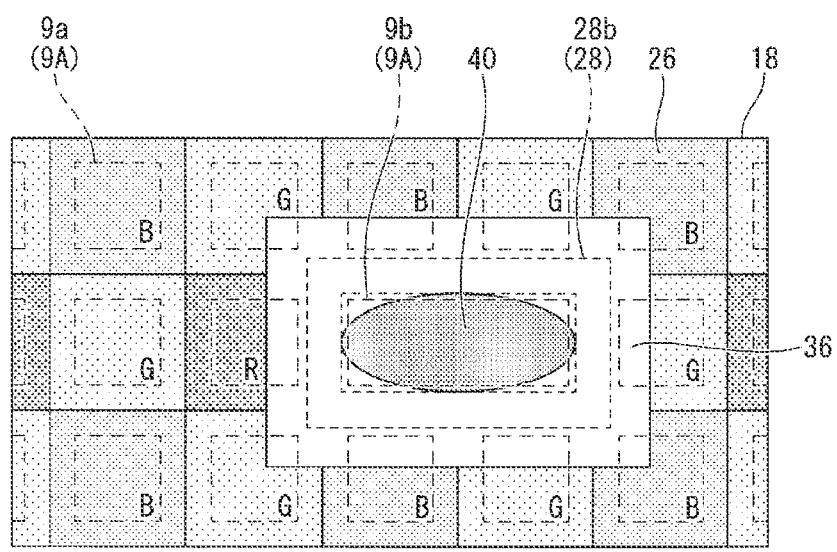
FIG. 24B is a planar configuration diagram of the pixel region of FIG. 24A, omitting an on-chip lens layer.

Next, the solid-state imaging device 1 according to an eleventh embodiment will be described. The solid-state imaging device 1 according to the eleventh embodiment is obtained by changing part of the configuration of the solid-state imaging device 1 according to the tenth embodiment. Since the configuration of the entire solid-state imaging device 1 according to the eleventh embodiment is similar to that in FIG. 1, illustration thereof is omitted. FIG. 24A is a cross-sectional configuration diagram of main parts of the solid-state imaging device 1 according to the eleventh embodiment. In FIG. 24A, portions corresponding to those in FIG. 2A, FIG. 15, and FIG. 23A will be denoted by the same reference symbols and overlapping description is omitted. FIG. 24B is a planar configuration diagram of the pixel region 3, omitting the on-chip lens layer 19.

The solid-state imaging device 1 according to the eleventh embodiment is different from that according to the tenth embodiment in the shape of the low-refractive index layer 36. In the eleventh embodiment, as shown in FIG. 24A and FIG. 24B, the low-refractive index layer 36 is formed so as to cover the second pixel unit 9b side of the back surface S6 (light incident surface) of the color filter 26 of the first pixel unit 9a adjacent to the second pixel unit 9b and the entire region of the back surface S6 (light incident surface) of the color filter 26 of the second pixel unit 9b in a continuous manner. That is, the low-refractive index layer 36 has a rectangular shape covering the back surface S6 (light incident surface) of the second pixel unit 9b, the back surface S6 of the second inter-CF light-shielding portion 28b (a light incident surface), and the back surface S6 (light incident surface) of the peripheral portion of the second inter-CF light-shielding portion 28b.

By covering the second pixel unit 9b side of the back surface S6 (light incident surface) of the color filter 26 of the first pixel unit 9a adjacent to the second pixel unit 9b with the low-refractive index layer 36, it is possible to cause, in the first pixel unit 9a adjacent to the second pixel unit 9b, the incident light 37 that travels to the light incident surface of the photoelectric conversion unit 23 of the first pixel unit 9a, of incident light that is transmitted through the boundary region between the edge of the on-chip lens 27b of the second pixel unit 9b and the edge of the on-chip lens 27a of the first pixel unit 9a, to be reflected on the interface between the on-chip lens layer 19 (on-chip lens 27a) and the low-refractive index layer 36 and more appropriately suppress optical color mixing.

Further, with the configuration in which the low-refractive index layer 36 does not cover the back surface S6 (light incident surface) of the first pixel unit 9a that is not adjacent to the second pixel unit 9b, it is possible to prevent, in the first pixel unit 9a, the incident light 32 that is collected by the on-chip lens 27a and travels to the photoelectric conversion unit 23 from being reflected on the interface between the on-chip lens layer 19 and the low-refractive index layer 36, suppress the reduction in the amount of incident light onto the photoelectric conversion unit 23 of the first pixel unit 9a, and further improve the sensitivity.

Figure 25:
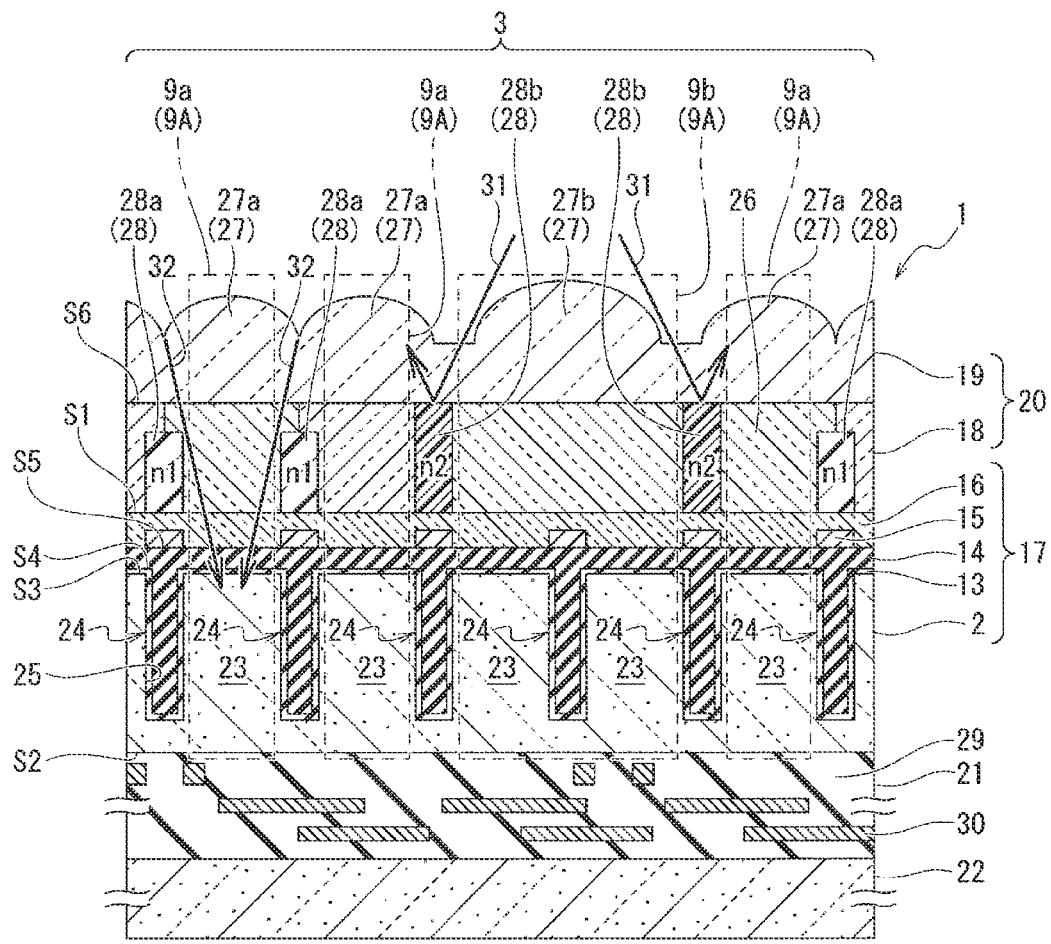
FIG. 25 is a diagram showing a cross-sectional configuration of a pixel region of a solid-state imaging device according to a modified example.

12. Modified Example (1) Note that in the solid-state imaging devices 1 according to the first to tenth embodiments, the refractive index of each of the first inter-CF light-shielding portion 28a and the second inter-CF light-shielding portion 28b (inter-CF light-shielding portion 28) may be made lower than those of the on-chip lens 27 and the color filter 26, and a refractive index $n2$ of the second inter-CF light-shielding portion 28b and a refractive index $n1$ of the first inter-CF light-shielding portion 28a may be made different from each other as shown in FIG. 25. For example, the refractive index $n2$ of the second inter-CF light-shielding portion 28b may be made lower than the refractive index $n1$ of the first inter-CF light-shielding portion 28a ($n2<n1$).

With the relationship of $n2<n1$, since the refractive index $n2$ of the second inter-CF light-shielding portion 28b is low, it is possible to more reliably cause, in the first pixel unit 9a adjacent to the second pixel unit 9b, the incident light 31 that has been transmitted through the boundary region between the edge of the on-chip lens 27b of the second pixel unit 9b and the edge of the on-chip lens 27 of the first pixel unit 9a to be reflected on the light incident surface of the second inter-CF light-shielding portion 28b and more reliably suppress optical color mixing. Further, since the refractive index $n1$ of the first inter-CF light-shielding portion 28a is low, it is possible to prevent, in the first pixel unit 9a, the incident light 32 that has been transmitted through the on-chip lens 27a of the first pixel unit 9a from being reflected on the light incident surface side of the first inter-CF light-shielding portion 28a. Therefore, it is possible to suppress the reduction in the amount of incident light onto the photoelectric conversion unit 23 of the first pixel unit 9a and improve the sensitivity.

Figure 26:
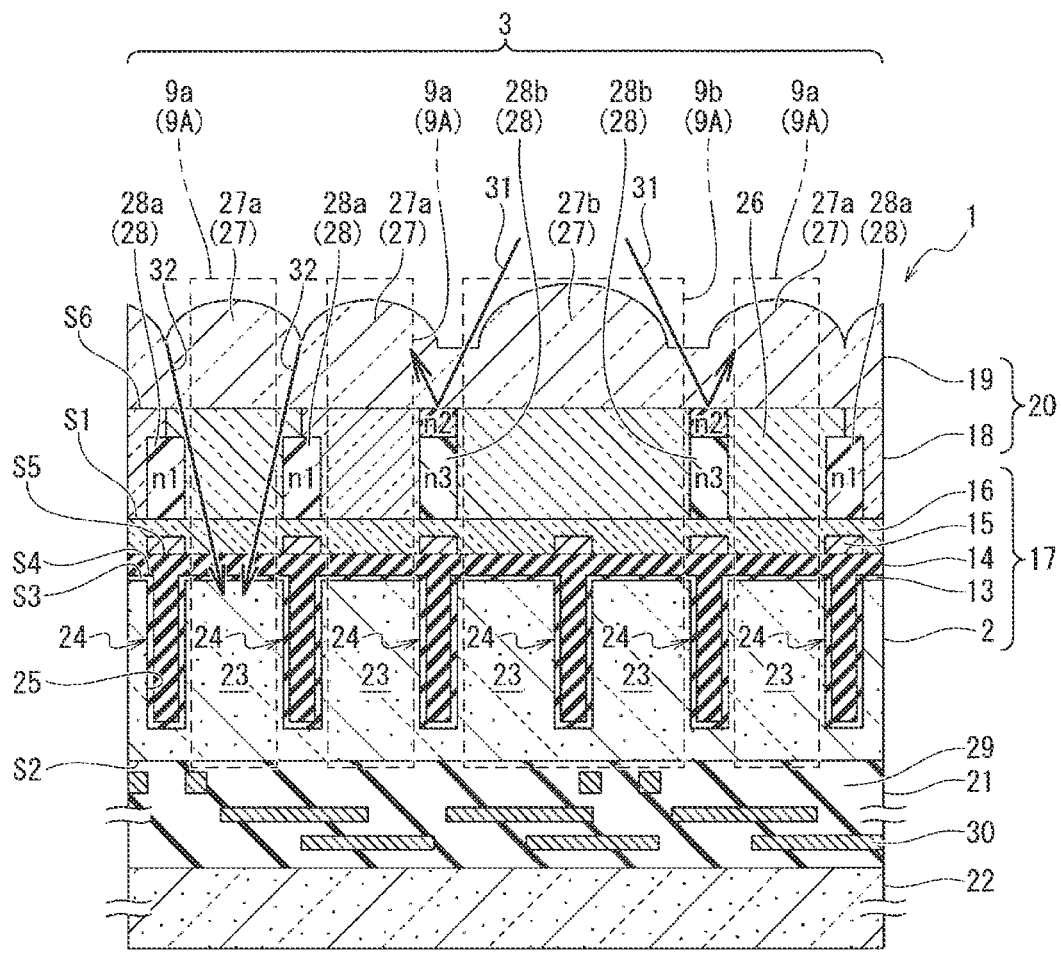
FIG. 26 is a diagram showing a cross-sectional configuration of a pixel region of the solid-state imaging device according to the modified example.

(2) Further, for example, in the first to eleventh embodiments, the refractive index of each of the first inter-CF light-shielding portion 28a and the second inter-CF light-shielding portion 28b (the inter-CF light-shielding portion 28) may be made lower than those of the on-chip lens 27 and the color filter 26, and the refractive index $n2$ of the second inter-CF light-shielding portion 28b on the back surface S6 side (light incident surface side) may be made lower than a refractive index $n3$ of the second inter-CF light-shielding portion 28b on the substrate 2 side and the refractive index $n1$ of the first inter-CF light-shielding portion 28a ($n2<n1$ and $n3$) as shown in FIG. 26. Note that $n1$ and $n3$ may be the same value or may be different values. That is, the material of the first inter-CF light-shielding portion 28a and the material of the second inter-CF light-shielding portion 28b on the substrate 2 side may be the same material or may be different materials. With the relationship of $n2<n1$ and $n3$, since the refractive index $n2$ of the second inter-CF light-shielding portion 28b on the on-chip lens 27b side is low, it is possible to more reliably cause, in the first pixel unit 9a adjacent to the second pixel unit 9b, the incident light 31 that has been transmitted through the boundary region between the edge of the on-chip lens 27b of the second pixel unit 9b and the edge of the on-chip lens 27 of the first pixel unit 9a to be reflected on the light incident surface of the second inter-CF light-shielding portion 28b and more reliably suppress optical color mixing. Further, since the refractive index $n1$ of the first inter-CF light-shielding portion 28a is low, it is possible to prevent, in the first pixel unit 9a, the incident light 32 that has been transmitted through the on-chip lens 27a of the first pixel unit 9a from being reflected on the light incident surface side of the first inter-CF light-shielding portion 28a. Therefore, it is possible to suppress the reduction in the amount of incident light onto the photoelectric conversion unit 23 of the first pixel unit 9a and improve the sensitivity.

(3) Further, for example, in the first to eleventh embodiments, the height of each side of the second inter-CF light-shielding portion 28b may differ. Here, for example, as shown in FIG. 2B, the edge of the projecting lens surface of the on-chip lens 27b of the second pixel unit 9b has an elliptical shape in plan view, and a distance from Lb from the vertex on the long axis of the elliptical shape to the short side of the second pixel unit 9b is larger than a distance La from the vertex on the short axis to the short side of the second pixel unit 9b. Therefore, a height H2a of the portion corresponding to the short side of the second inter-CF light-shielding portion 28b may be made larger than a height H2b of the portion corresponding to the long side (H2a>H2b). Note that the height H2b of the portion corresponding to the long side of the second inter-CF light-shielding portion 28b and the height H1 of the first inter-CF light-shielding portion 28a may be the same (H2b=H1), or the relationship of H2b>H1 may be established. With the relationship of H2a>H2b, since the height H2a of the portion corresponding to the short side of the second inter-CF light-shielding portion 28b is large, it is possible to more reliably cause, in the first pixel unit 9a adjacent to the second pixel unit 9b, the incident light 31 that has been transmitted through the boundary region between the edge of the on-chip lens 27b of the second pixel unit 9b and the edge of the on-chip lens 27 of the first pixel unit 9a to be reflected on the light incident surface of the second inter-CF light-shielding portion 28b and more reliably suppress optical color mixing.

13. Application Example to Electronic Apparatus 13-1 Configuration of Entire Electronic Apparatus The technology according to the present disclosure (the present technology) may be applied to various electronic apparatuses.

FIG. 27 is a block diagram showing a configuration example of an embodiment of an imaging device (a video camera, a digital still camera) as an electronic apparatus to which the present disclosure is applied.

As shown in FIG. 27, an imaging device 1000 includes the lens group 1001, the solid-state imaging device 1002 (solid-state imaging device according to the first to eleventh embodiments), a DSP (Digital Signal Processor) circuit 1003, a frame memory 1004, a display unit 1005, and a recording unit 1006. The DSP circuit 1003, the frame memory 1004, the display unit 1005, and the recording unit 1006 are connected to each other via a bus line 1007.

The lens group 1001 takes in incident light (image light) from a subject, leads the light into the solid-state imaging device 1002, and forms an image of the light on the light-receiving surface (pixel region) of the solid-state imaging device 1002.

The solid-state imaging device 1002 includes the CMOS image sensor according to the first to eleventh embodiments. The solid-state imaging device 1002 converts the light amount of incident light formed on the imaging surface by the lens group 1001 into an electrical signal in units of pixels and supplies the electrical signal to the DSP circuit 1003 as a pixel signal.

The DSP circuit 1003 performs predetermined image processing on the pixel signal supplied from the solid-state imaging device 1002. Then, the DSP circuit 1003 supplies the image signal after the image processing to the frame memory 1004 in units of frames and causes the frame memory 1004 to temporarily store the image signal.

The display unit 1005 includes, for example, a panel-type display device such as a liquid crystal panel and an organic EL (Electro Luminescence) panel. The display unit 1005 displays an image (moving image) of a subject on the basis of the pixel signal in units of frames temporarily stored in the frame memory 1004.

The recording unit 1006 includes a DVD, a flash memory, or the like. The recording unit 1006 reads and records the pixel signal in units of frames temporarily stored in the frame memory 1004.

An example of an electronic apparatus to which the technology according to the present disclosure can be applied has been described above. The technology according to the present disclosure can be applied to the solid-state imaging device 1002 of the configurations described above. Specifically, the solid-state imaging device 1 in FIG. 1 can be applied to the solid-state imaging device 1002. By applying the technology according to the present disclosure to the solid-state imaging device 1002, it is possible to acquire a more favorable image.

13-2 Usage Example of CMOS Image Sensor

Note that the electronic apparatus to which the present technology is applied only needs to be a device using a CMOS image sensor as an image capturing unit, and can be used in, for example, various cases for sensing light such as visible light, infrared light, ultraviolet light, and X-rays as follows, in addition to the imaging device 1000.

Figure 28:
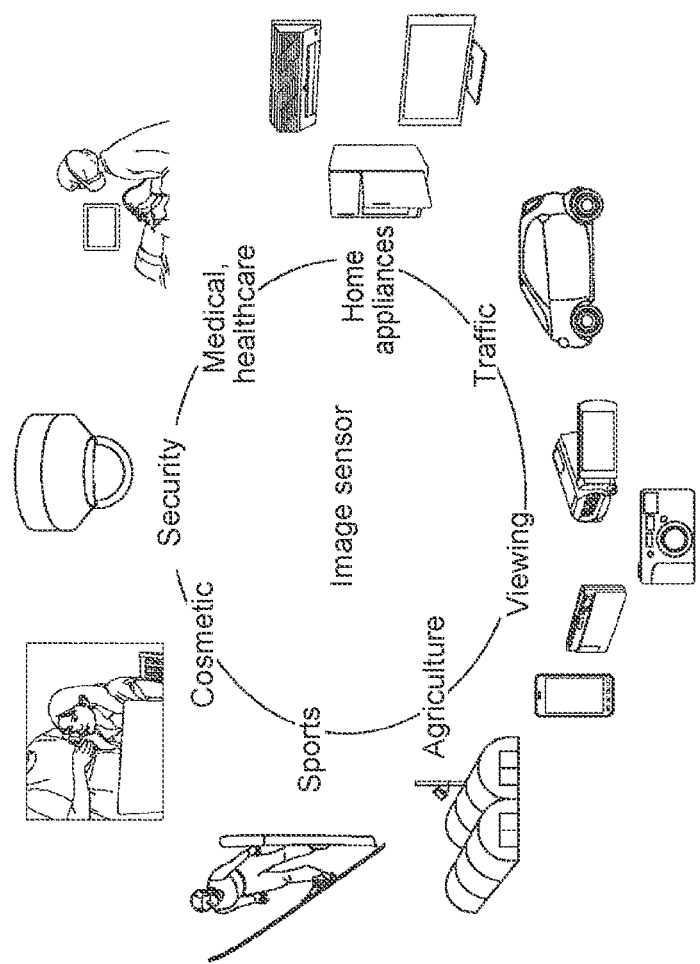
FIG. 28 is a diagram showing a usage example using a CMOS image sensor.

Apparatus for taking images used for viewing, such as a digital camera and a portable device with a camera function, as shown in FIG. 28

Apparatus used for traffic purposes such as an in-vehicle sensor for imaging the front, rear, surrounding, and interior of automobiles for safe driving such as automatic stopping or for recognizing the state of drivers, etc., a monitoring camera for monitoring traveling vehicles and roads, and a ranging sensor for ranging between vehicles, etc.

Apparatus used in home appliances such as a TV, a refrigerator, and an air conditioner to image the gestures of users and perform device operations in accordance with the gestures Apparatus used for medical and healthcare purposes, such as an endoscope and an apparatus that performs angiography by receiving infrared light Apparatus used for security purposes, such as a monitoring camera for security purposes and a camera for personal identification purposes Apparatus used for cosmetic purposes, such as a skin measuring apparatus for imaging skin and a microscope for imaging scalp Apparatus used for sports purposes, such as an action camera for sports purposes and a wearable camera Apparatus used for agricultural purposes, such as a camera for monitoring the states of fields and crops 14. Application Example to Moving Object The technology according to the present disclosure (the present technology) may be realized as, for example, a device to be mounted on any type of moving object such as an automobile, an electric vehicle, a hybrid electric vehicle, a motorcycle, a bicycle, personal mobility, an airplane, a drone, a ship, and a robot.

Figure 29:
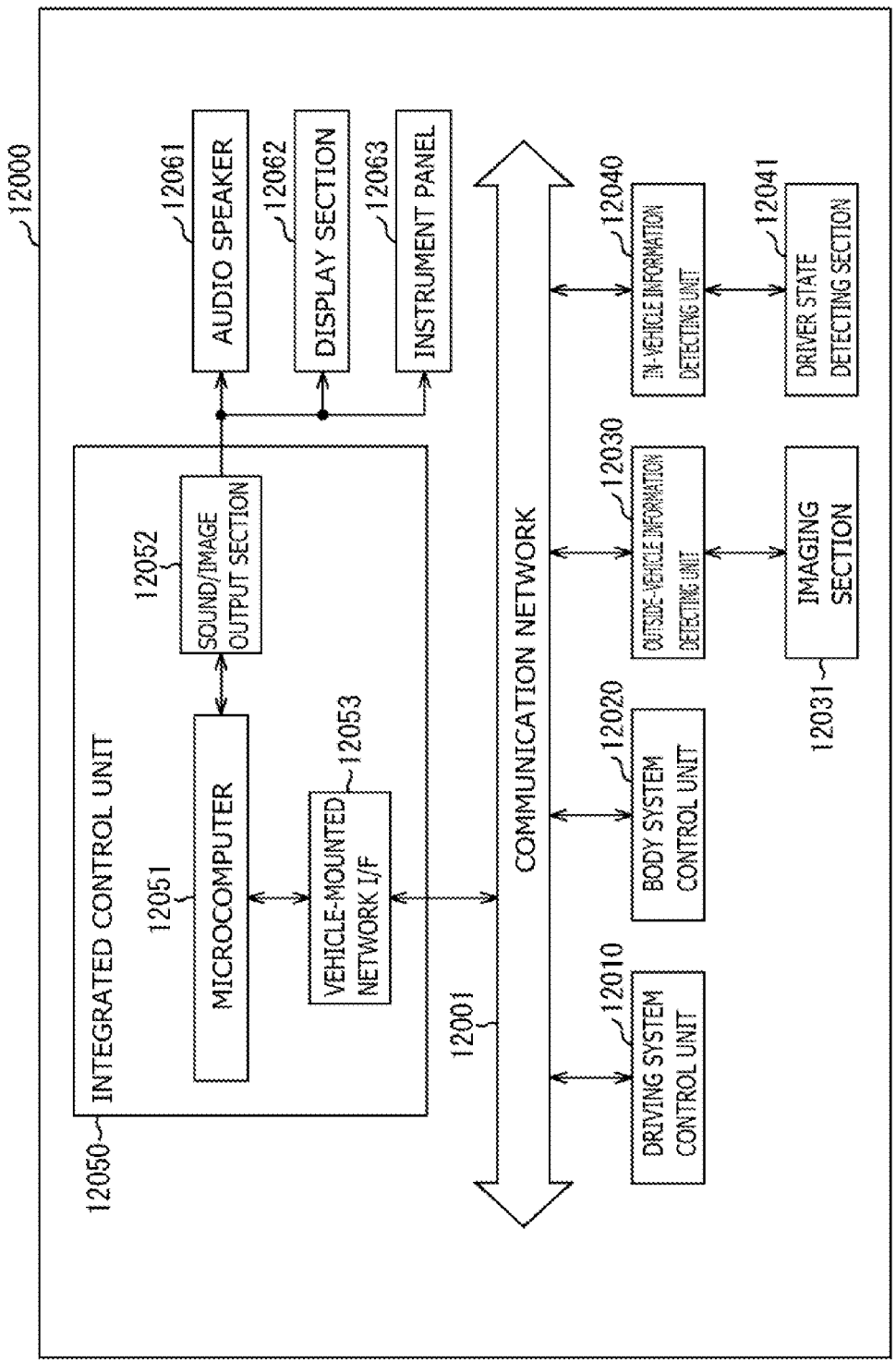
FIG. 29 is a block diagram depicting an example of schematic configuration of a vehicle control system.

FIG. 29 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG.

29, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 29, an audio speaker 12061, a display section 12062, and an instrument panel 12063 are illustrated as the output device. The display section 12062 may, for example, include at least one of an on-board display and a head-up display.

Figure 30:
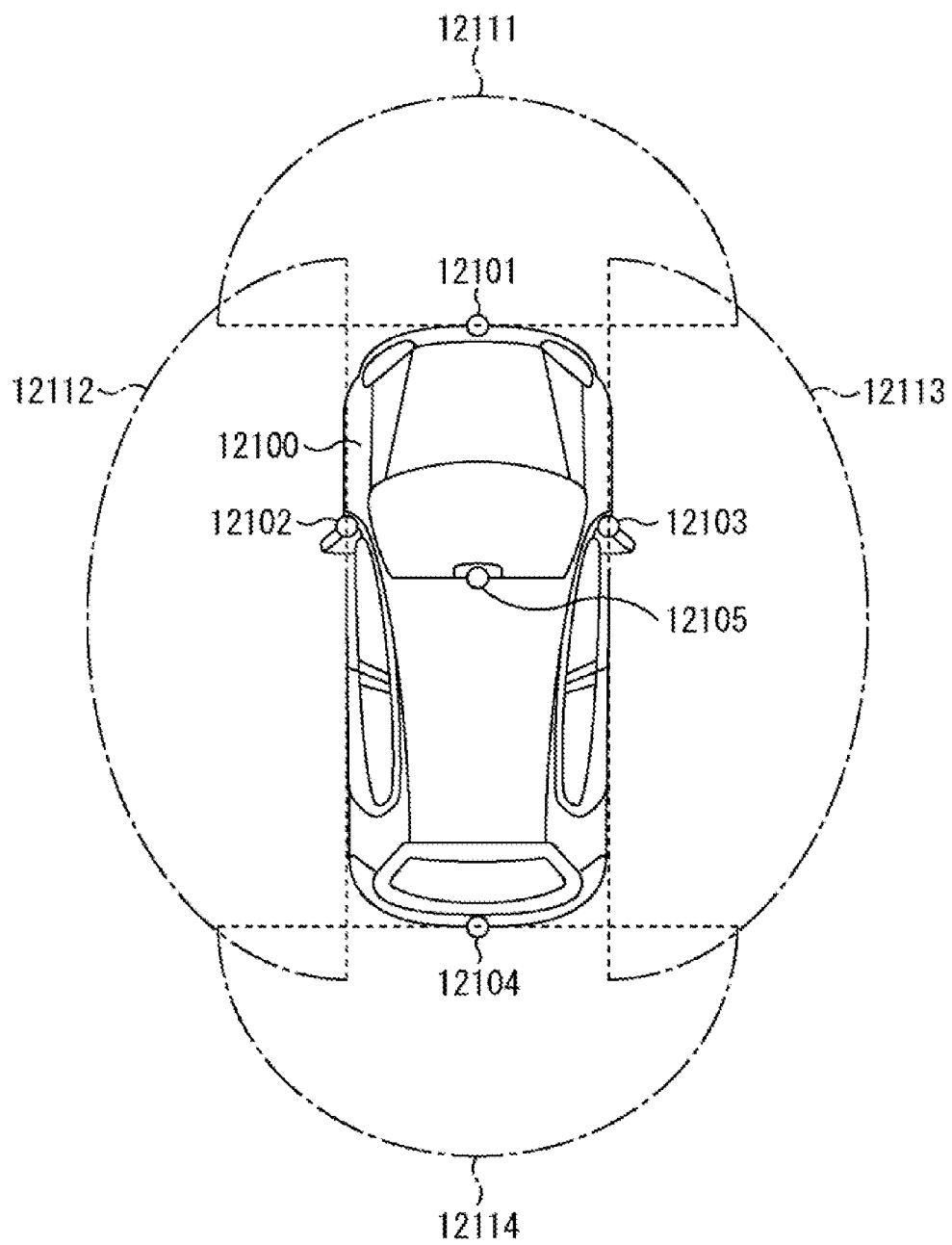
FIG. 30 is a diagram of assistance in explaining an example of installation positions of an outside-vehicle information detecting section and an imaging section.

FIG. 30 is a diagram depicting an example of the installation position of the imaging section 12031.

In FIG. 30, the vehicle 12100 includes, as the imaging section 12031, imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The image of the front acquired by the imaging sections 12101 and 12105 are used mainly to detect a preceding vehicle, a pedestrian, an obstacle, a signal, a traffic sign, a lane, or the like.

Incidentally, FIG. 30 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of a vehicle control system to which the technology according to the present disclosure can be applied has been described above. The technology according to the present disclosure can be applied to the imaging section 12031, of the configurations described above. Specifically, the solid-state imaging device 1 in FIG. 1 can be applied to the imaging section 12031. Since a favorable image can be acquired by applying the technology according to the present disclosure to the imaging section 12031, it is possible to reduce driver fatigue.

15. Application Example to Endoscopic Surgery System

The technology according to the present disclosure (the present technology) may be applied to, for example, an endoscopic surgery system.

Figure 31:
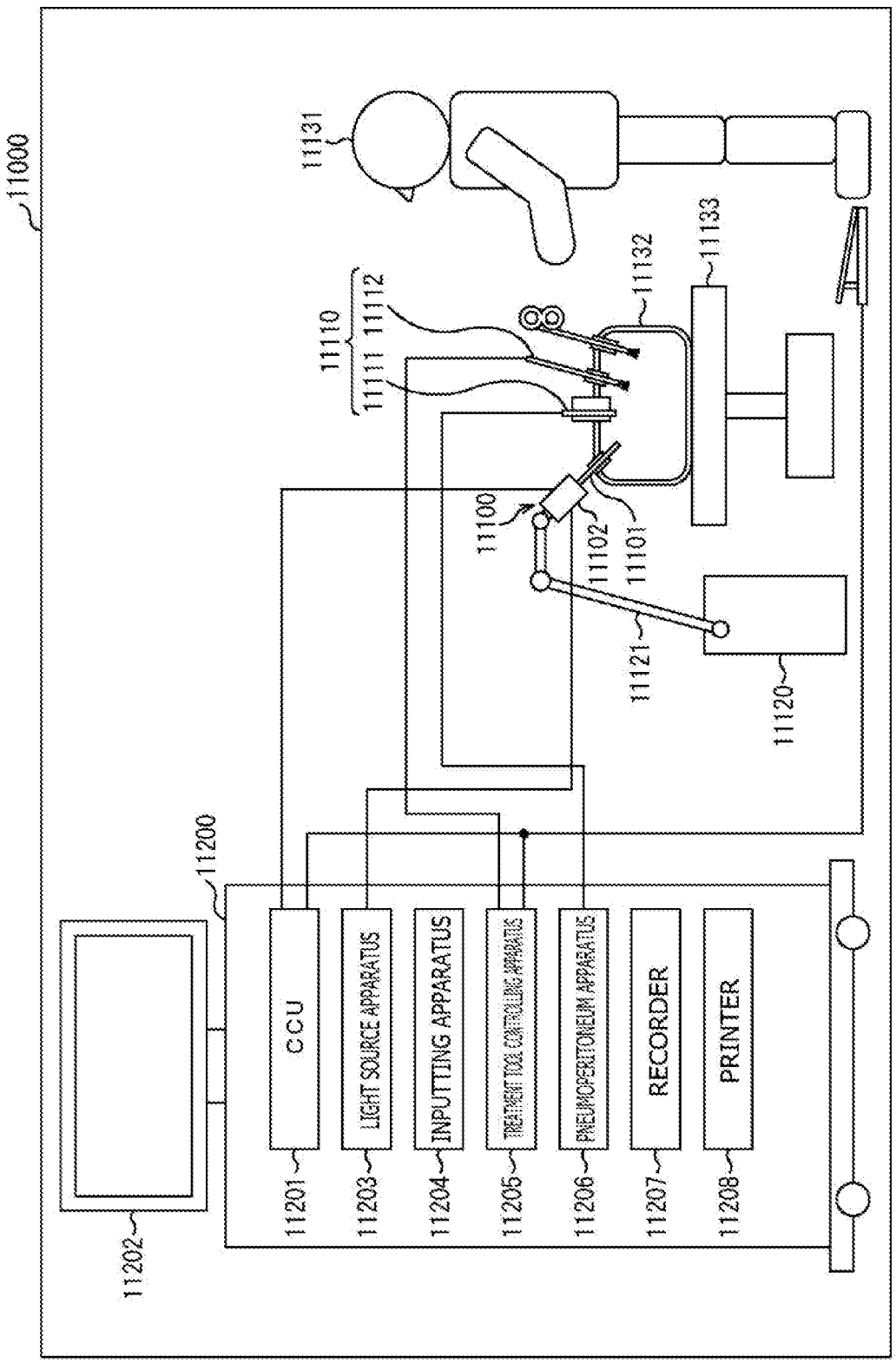
FIG. 31 is a view depicting an example of a schematic configuration of an endoscopic surgery system.

FIG. 31 is a view depicting an example of a schematic configuration of an endoscopic surgery system to which the technology according to an embodiment of the present disclosure (present technology) can be applied.

In FIG. 31, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy treatment tool 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body lumen of the patient 11132, and a camera head 11102 connected to a proximal end of the lens barrel 11101. In the example depicted, the endoscope 11100 is depicted which includes as a hard mirror having the lens barrel 11101 of the hard type. However, the endoscope 11100 may otherwise be included as a soft mirror having the lens barrel 11101 of the soft type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body lumen of the patient 11132 through the objective lens. It is to be noted that the endoscope 11100 may be a direct view mirror or may be a perspective view mirror or a side view mirror.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy treatment tool 11112 for cautery or incision of a tissue, sealing of a blood vessel or the like. A pneumoperitoneum apparatus 11206 feeds gas into a body lumen of the patient 11132 through the pneumoperitoneum tube 11111 to inflate the body lumen in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 32:
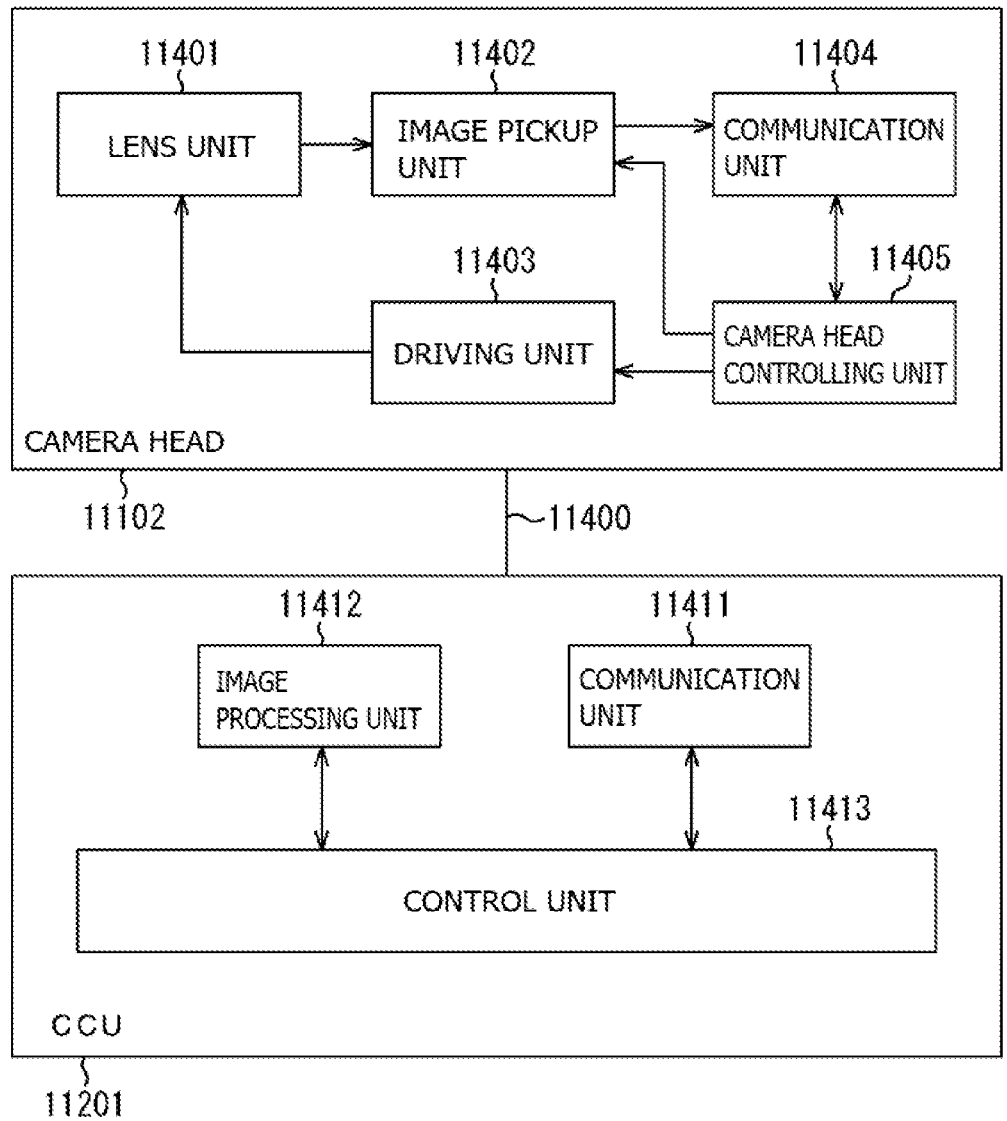
FIG. 32 is a block diagram depicting an example of a functional configuration of a camera head and a camera control unit (CCU).

FIG. 32 is a block diagram depicting an example of a functional configuration of the camera head 11102 and the CCU 11201 depicted in FIG. 31.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The image pickup unit 11402 includes an image pickup element. The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy treatment tool 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

An example of an endoscopic surgery system to which the technology according to the present disclosure can be applied has been described above. The technology according to the present disclosure can be applied to the image pickup unit 11402, of the configurations described above. Specifically, the solid-state imaging device 1 in FIG. 1 can be applied to the image pickup unit 10402. Since a clearer image of the surgical region can be acquired by applying the technology according to the present disclosure to the image pickup unit 10402, the surgeon can reliably check the surgical region.

Note that the endoscopic surgery system has been described here as an example, but the technology according to the present disclosure may be applied to, for example, a microscopic surgery system or the like.

It should be noted that the present technology may take the following configurations.

(1) A solid-state imaging device, including:
a plurality of pixel units including on-chip lenses, color filters, and photoelectric conversion units; and
a lattice-shaped inter-color-filter light-shielding portion formed on a side of light incident surfaces of the photoelectric conversion units so as to surround the respective color filters of the plurality of pixel units,
the plurality of pixel units including a first pixel unit and a second pixel unit, the first pixel unit including an on-chip lens of a predetermined size, the second pixel unit including an on-chip lens of a size larger than the predetermined size, the first pixel unit including first pixel units, the second pixel unit including second pixel units,
a height of the inter-color-filter light-shielding portion surrounding the respective color filters of the second pixel units being larger than a height of the inter-color-filter light-shielding portion between the respective color filters of the first pixel units.

(2) The solid-state imaging device according to (1) above, in which
the second pixel unit is a pixel unit that includes a plurality of the photoelectric conversion units for one on-chip lens.

(3) The solid-state imaging device according to (2) above, in which
the on-chip lens of the second pixel unit has a size twice and one time a size of the on-chip lens of the first pixel unit in a row direction and a column direction, respectively, or a size one time and twice the size of the on-chip lens of the first pixel unit in the row direction and in the column direction, respectively.

(4) The solid-state imaging device according to any one of (1) to (3) above, in which
the first pixel unit is a pixel unit that includes one photoelectric conversion unit for one on-chip lens.

(5) The solid-state imaging device according to any one of (1) to (4) above, further including
a low-refractive index layer that is formed between a color filter layer that includes a plurality of the color filters and an on-chip lens layer that includes a plurality of the on-chip lenses and has a refractive index lower than that of the on-chip lens.

(6) The solid-state imaging device according to (5) above, in which
the low-refractive index layer is formed so as to cover an entire region of a light incident surface of the color filter layer.

(7) The solid-state imaging device according to (6) above, in which
the low-refractive index layer has a parabolic shape in which a central portion of a region facing the on-chip lens of the second pixel unit is recessed toward a side of the color filter such that the on-chip lens has a projecting lens surface on a side of the low-refractive index layer.

(8) The solid-state imaging device according to (6) above, further including
a high-refractive index layer that is formed so as to cover a light incident surface of the color filter of the second pixel unit with the low-refractive index layer sandwiched therebetween and has a refractive index higher than that of the on-chip lens, in which
the high-refractive index layer has a projecting lens surface on a side of the on-chip lens.

(9) The solid-state imaging device according to (5) above, in which
the low-refractive index layer is formed so as to cover a light incident surface of the color filter layer other than a light incident surface of the color filter of the second pixel unit.

(10) The solid-state imaging device according to (9) above, in which
the low-refractive index layer is formed so as to cover only a portion on a side of the second pixel unit, of a light incident surface of the color filter of the first pixel unit adjacent to the second pixel unit.

(11) The solid-state imaging device according to (5) above, in which
the low-refractive index layer is formed so as to cover a light incident surface of the color filter layer other than a central portion of a region facing the on-chip lens of the second pixel unit.

(12) The solid-state imaging device according to (5) above, in which
the low-refractive index layer is formed so as to cover a light incident surface of the color filter of the second pixel unit and a light incident surface on a side of the second pixel unit of the color filter of the first pixel unit adjacent to the second pixel unit.

(13) The solid-state imaging device according to (12) above, in which
the low-refractive index layer has a parabolic shape in which
a central portion of a region facing the on-chip lens of the second pixel unit is recessed toward a side of the color filter such that the on-chip lens has a projecting lens surface on a side of the low-refractive index layer.

(14) The solid-state imaging device according to (12) above, in which
the low-refractive index layer is formed so as to cover only a portion on outer periphery side of a light incident surface of the color filter of the second pixel unit.

(15) The solid-state imaging device according to (12) above, further including
a high-refractive index layer that is formed so as to cover a light incident surface of the color filter of the second pixel unit with the low-refractive index layer sandwiched therebetween and has a refractive index higher than that of the on-chip lens, in which
the high-refractive index layer has a projecting lens surface on a side of the on-chip lens.

(16) The solid-state imaging device according to (1) above, further including
a high-refractive index layer that is formed between the color filter of the second pixel unit and the on-chip lens and has a refractive index higher than that of the on-chip lens, in which
the high-refractive index layer has a projecting lens surface on a side of the on-chip lens.

(17) The solid-state imaging device according to any one of (1) to (16) above, in which
the inter-color-filter light-shielding portion has a refractive index lower than those of the on-chip lens and the color filter, and
the refractive index of the inter-color-filter light-shielding portion surrounding the respective color filters of the second pixel units is lower than a refractive index of the inter-color-filter light-shielding portion between the color filters of the first pixel units.

(18) The solid-state imaging device according to any one of (1) to (16) above, in which
the inter-color-filter light-shielding portion has a refractive index lower than those of the on-chip lens and the color filter, and
the refractive index of the inter-color-filter light-shielding portion surrounding the respective color filters of the second pixel units on a side of the light incident surface is lower than the refractive index of the inter-color-filter light-shielding portion on a side of the substrate and a refractive index of a first inter-color-filter light-shielding portion that is the inter-color-filter light-shielding portion between the color filters of the first pixel units.

(19) An electronic apparatus, including
a solid-state imaging device that includes
a plurality of pixel units including on-chip lenses, color filters, and photoelectric conversion units, and
a lattice-shaped inter-color-filter light-shielding portion formed on a side of light incident surfaces of the photoelectric conversion units so as to surround the respective color filters of the plurality of pixel units,
the plurality of pixel units including a first pixel unit and a second pixel unit, the first pixel unit including an on-chip lens of a predetermined size, the second pixel unit including an on-chip lens of a size larger than the predetermined size, the first pixel unit including first pixel units, the second pixel unit including second pixel units,
a height of the inter-color-filter light-shielding portion surrounding the respective color filters of the second pixel units being larger than a height of the inter-color-filter light-shielding portion between the respective color filters of the first pixel units.

REFERENCE SIGNS LIST 1 solid-state imaging device
2 substrate
3 pixel region
4 vertical drive circuit
5 column signal processing circuit
6 horizontal drive circuit
7 output circuit
8 control circuit
9 pixel
9A pixel unit
9a first pixel unit
9b second pixel unit
10 pixel drive wire
11 vertical signal line
12 horizontal signal line
13 fixed charge film
14 insulation film
15 light-shielding film
16 flattening film
17 light receiving layer
18 color filter layer
19 on-chip lens layer
20 light collection layer
21 wiring layer
22 support substrate
23 photoelectric conversion unit
24 pixel separation unit
25 a trench portion
26 color filter
27, 27a, 27b on-chip lens
28 inter-CF light-shielding portion
28a first inter-CF light-shielding portion
28b second inter-CF light-shielding portion
29 interlayer insulating film
30 wire
31, 32 incident light
33 inter-CF light-shielding film
34, 35 resist film
36 low-refractive index layer
37, 38, 39 incident light
40 high-refractive index layer
41 incident light
1000 imaging device
1001 lens group
1002 solid-state image sensor
1003 DSP circuit
1004 frame memory
1005 display unit
1006 recording unit
1007 bus line

What is claimed is:

1. A solid-state imaging device, comprising:
a plurality of pixel units including on-chip lenses, color filters, and photoelectric conversion units; and
a lattice-shaped inter-color-filter light-shielding portion formed on a side of light incident surfaces of the photoelectric conversion units so as to surround the respective color filters of the plurality of pixel units,
the plurality of pixel units including a first pixel unit and a second pixel unit, the first pixel unit including an on-chip lens of a predetermined size, the second pixel unit including an on-chip lens of a size larger than the predetermined size, the first pixel unit including first pixel units, the second pixel unit including second pixel units,
a height of the inter-color-filter light-shielding portion surrounding the respective color filters of the second pixel units being larger than a height of the inter-color-filter light-shielding portion between the respective color filters of the first pixel units.

2. The solid-state imaging device according to claim 1, wherein
the second pixel unit is a pixel unit that includes a plurality of the photoelectric conversion units for one on-chip lens.

3. The solid-state imaging device according to claim 2, wherein
the on-chip lens of the second pixel unit has a size twice and one time a size of the on-chip lens of the first pixel unit in a row direction and a column direction, respectively, or a size one time and twice the size of the on-chip lens of the first pixel unit in the row direction and in the column direction, respectively.

4. The solid-state imaging device according to claim 1, wherein
the first pixel unit is a pixel unit that includes one photoelectric conversion unit for one on-chip lens.

5. The solid-state imaging device according to claim 1, further comprising
a low-refractive index layer that is formed between a color filter layer that includes a plurality of the color filters and an on-chip lens layer that includes a plurality of the on-chip lenses and has a refractive index lower than that of the on-chip lens.

6. The solid-state imaging device according to claim 5, wherein
the low-refractive index layer is formed so as to cover an entire region of a light incident surface of the color filter layer.

7. The solid-state imaging device according to claim 6, wherein
the low-refractive index layer has a parabolic shape in which a central portion of a region facing the on-chip lens of the second pixel unit is recessed toward a side of the color filter such that the on-chip lens has a projecting lens surface on a side of the low-refractive index layer.

8. The solid-state imaging device according to claim 6, further comprising
a high-refractive index layer that is formed so as to cover a light incident surface of the color filter of the second pixel unit with the low-refractive index layer sandwiched therebetween and has a refractive index higher than that of the on-chip lens, wherein
the high-refractive index layer has a projecting lens surface on a side of the on-chip lens.

9. The solid-state imaging device according to claim 5, wherein
the low-refractive index layer is formed so as to cover a light incident surface of the color filter layer other than a light incident surface of the color filter of the second pixel unit.

10. The solid-state imaging device according to claim 9, wherein
the low-refractive index layer is formed so as to cover only a portion on a side of the second pixel unit, of a light incident surface of the color filter of the first pixel unit adjacent to the second pixel unit.

11. The solid-state imaging device according to claim 5, wherein the low-refractive index layer is formed so as to cover a light incident surface of the color filter layer other than a central portion of a region facing the on-chip lens of the second pixel unit.

12. The solid-state imaging device according to claim 5, wherein
the low-refractive index layer is formed so as to cover a light incident surface of the color filter of the second pixel unit and a light incident surface on a side of the second pixel unit of the color filter of the first pixel unit adjacent to the second pixel unit.

13. The solid-state imaging device according to claim 12, wherein
the low-refractive index layer has a parabolic shape in which a central portion of a region facing the on-chip lens of the second pixel unit is recessed toward a side of the color filter such that the on-chip lens has a projecting lens surface on a side of the low-refractive index layer.

14. The solid-state imaging device according to claim 12, wherein
the low-refractive index layer is formed so as to cover only a portion on outer periphery side of a light incident surface of the color filter of the second pixel unit.

15. The solid-state imaging device according to claim 12, further comprising
a high-refractive index layer that is formed so as to cover a light incident surface of the color filter of the second pixel unit with the low-refractive index layer sandwiched therebetween and has a refractive index higher than that of the on-chip lens, wherein
the high-refractive index layer has a projecting lens surface on a side of the on-chip lens.

16. The solid-state imaging device according to claim 1, further comprising
a high-refractive index layer that is formed between the color filter of the second pixel unit and the on-chip lens and has a refractive index higher than that of the on-chip lens, wherein
the high-refractive index layer has a projecting lens surface on a side of the on-chip lens.

17. The solid-state imaging device according to claim 1, wherein
the inter-color-filter light-shielding portion has a refractive index lower than those of the on-chip lens and the color filter, and
the refractive index of the inter-color-filter light-shielding portion surrounding the respective color filters of the second pixel units is lower than a refractive index of the inter-color-filter light-shielding portion between the color filters of the first pixel units.

18. The solid-state imaging device according to claim 1, wherein
the inter-color-filter light-shielding portion has a refractive index lower than those of the on-chip lens and the color filter, and
the refractive index of the inter-color-filter light-shielding portion surrounding the respective color filters of the second pixel units on a side of the light incident surface is lower than the refractive index of the inter-color-filter light-shielding portion on a side of a substrate and a refractive index of a first inter-color-filter light-shielding portion that is the inter-color-filter light-shielding portion between the color filters of the first pixel units.

19. An electronic apparatus, comprising
a solid-state imaging device that includes
a plurality of pixel units including on-chip lenses, color filters, and photoelectric conversion units, and
a lattice-shaped inter-color-filter light-shielding portion formed on a side of light incident surfaces of the photoelectric conversion units so as to surround the respective color filters of the plurality of pixel units,
the plurality of pixel units including a first pixel unit and a second pixel unit, the first pixel unit including an on-chip lens of a predetermined size, the second pixel unit including an on-chip lens of a size larger than the predetermined size, the first pixel unit including first pixel units, the second pixel unit including second pixel units,
a height of the inter-color-filter light-shielding portion surrounding the respective color filters of the second pixel units being larger than a height of the inter-color-filter light-shielding portion between the respective color filters of the first pixel units.

* * * * *